US009824007B2

(12) United States Patent
Desai et al.

(10) Patent No.: US 9,824,007 B2
(45) Date of Patent: *Nov. 21, 2017

(54) DATA INTEGRITY ENHANCEMENT TO PROTECT AGAINST RETURNING OLD VERSIONS OF DATA

(71) Applicant: SanDisk Technologies LLC, Plano, TX (US)

(72) Inventors: Girish B. Desai, Cupertino, CA (US); William L. Guthrie, Santa Cruz, CA (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,552

(22) Filed: Feb. 24, 2015

(65) Prior Publication Data

US 2016/0147468 A1 May 26, 2016

Related U.S. Application Data

(60) Provisional application No. 62/082,849, filed on Nov. 21, 2014.

(51) Int. Cl.
*G06F 12/02* (2006.01)
*G06F 12/10* (2016.01)
(Continued)

(52) U.S. Cl.
CPC .......... *G06F 12/0246* (2013.01); *G06F 11/10* (2013.01); *G06F 11/34* (2013.01);
(Continued)

(58) Field of Classification Search
None
See application file for complete search history.

(56) References Cited

U.S. PATENT DOCUMENTS 4,586,167 A 4/1986 Fujishima et al.
5,559,988 A 9/1996 Durante et al.
(Continued)

FOREIGN PATENT DOCUMENTS

EP 0 376 285 A2 7/1990
WO WO 2012/083308 6/2012

OTHER PUBLICATIONS

Tanenbaum ("Structured Computer Organization, 3rd ed. 1990," section 1.4, p. 11, hardware and software are logically equivalent).*
(Continued)

*Primary Examiner* — Jared Rutz
*Assistant Examiner* — Marwan Ayash
(74) *Attorney, Agent, or Firm* — Brinks Gilson & Lione

(57) ABSTRACT

Systems, methods and/or devices are used to enable enhancing data integrity to protect against returning old versions of data. In one aspect, the method includes (1) receiving a write request from a host that specifies write data for a set of logical block addresses in a logical address space of the host, (2) mapping the set of logical block addresses to a set of physical addresses corresponding to physical pages of the storage device, and (3) performing one or more operations for each logical block specified by the set of logical block addresses, including: (a) generating metadata for the logical block, the metadata including a version number for the logical block, (b) storing the metadata, including the version number, in a header of a physical page in which the logical block is stored, and (c) storing the version number in a version data structure.

25 Claims, 13 Drawing Sheets

(51) Int. Cl.
*G06F 11/34* (2006.01)
*G06F 11/10* (2006.01)

(52) U.S. Cl.
CPC ............... *G06F 2212/1016* (2013.01); *G06F 2212/1036* (2013.01); *G06F 2212/7201* (2013.01); *G06F 2212/7205* (2013.01); *G06F 2212/7207* (2013.01); *G06F 2212/7209* (2013.01)

(56) References Cited

U.S. PATENT DOCUMENTS

| | | | |
|---|---|---|---|
| 5,909,559 | A | 6/1999 | So |
| 6,247,136 | B1 | 6/2001 | MacWilliams et al. |
| 6,292,410 | B1 | 9/2001 | Yi et al. |
| 6,401,213 | B1 | 6/2002 | Jeddeloh |
| 6,449,709 | B1 | 9/2002 | Gates |
| 7,969,809 | B2 | 6/2011 | Ben-Rubi |
| 8,010,738 | B1 | 8/2011 | Chilton et al. |
| 8,122,202 | B2 | 2/2012 | Gillingham |
| 8,213,255 | B2 | 7/2012 | Hemink et al. |
| 8,255,618 | B1 | 8/2012 | Borchers et al. |
| 8,321,627 | B1 | 11/2012 | Norrie et al. |
| 8,429,498 | B1 | 4/2013 | Anholt et al. |
| 8,479,080 | B1 | 7/2013 | Shalvi et al. |
| 8,539,139 | B1 | 9/2013 | Morris |
| 8,595,590 | B1 | 11/2013 | Vojcic et al. |
| 8,775,720 | B1 | 7/2014 | Meyer et al. |
| 8,825,967 | B2 | 9/2014 | Hong Beom |
| 8,874,836 | B1 | 10/2014 | Hayes et al. |
| 8,886,872 | B1 | 11/2014 | Norrie |
| 8,924,661 | B1 | 12/2014 | Shachar et al. |
| 8,984,376 | B1 | 3/2015 | Norrie |
| 9,128,825 | B1 | 9/2015 | Albrecht et al. |
| 9,170,876 | B1 | 10/2015 | Bates et al. |
| 9,176,971 | B2 | 11/2015 | Shapiro |
| 9,214,965 | B2 | 12/2015 | Fitzpatrick et al. |
| 2003/0115403 | A1 | 6/2003 | Bouchard et al. |
| 2003/0122834 | A1 | 7/2003 | Mastronarde et al. |
| 2004/0117441 | A1 | 6/2004 | Liu et al. |
| 2005/0144361 | A1 | 6/2005 | Gonzalez et al. |
| 2005/0248992 | A1 | 11/2005 | Hwang et al. |
| 2006/0271725 | A1* | 11/2006 | Wong .............. G06F 12/0246 711/103 |
| 2007/0002629 | A1 | 1/2007 | Lee et al. |
| 2007/0156998 | A1 | 7/2007 | Gorobets |
| 2007/0233937 | A1 | 10/2007 | Coulson et al. |
| 2008/0140914 | A1 | 6/2008 | Jeon |
| 2008/0147994 | A1 | 6/2008 | Jeong et al. |
| 2008/0235466 | A1 | 9/2008 | Traister |
| 2008/0235480 | A1 | 9/2008 | Traister |
| 2008/0295094 | A1 | 11/2008 | Korupolu et al. |
| 2009/0168525 | A1 | 7/2009 | Olbrich et al. |
| 2009/0177943 | A1 | 7/2009 | Silvus et al. |
| 2009/0222627 | A1 | 9/2009 | Reid |
| 2009/0282191 | A1 | 11/2009 | Depta |
| 2010/0005217 | A1 | 1/2010 | Jeddeloh |
| 2010/0014364 | A1 | 1/2010 | Laberge et al. |
| 2010/0082879 | A1 | 4/2010 | McKean et al. |
| 2010/0165730 | A1 | 7/2010 | Sommer et al. |
| 2010/0174845 | A1 | 7/2010 | Gorobets et al. |
| 2010/0174853 | A1 | 7/2010 | Lee et al. |
| 2010/0220509 | A1 | 9/2010 | Sokolov et al. |
| 2010/0250874 | A1 | 9/2010 | Farrell et al. |
| 2011/0113204 | A1 | 5/2011 | Henriksson et al. |
| 2011/0138100 | A1 | 6/2011 | Sinclair |
| 2011/0235434 | A1 | 9/2011 | Byom et al. |
| 2011/0252215 | A1 | 10/2011 | Franceschini et al. |
| 2011/0264851 | A1 | 10/2011 | Jeon et al. |
| 2011/0302474 | A1* | 12/2011 | Goss .............. G06F 11/1004 714/758 |
| 2012/0030408 | A1 | 2/2012 | Flynn et al. |
| 2012/0047317 | A1 | 2/2012 | Yoon et al. |
| 2012/0159070 | A1 | 6/2012 | Baderdinni et al. |
| 2012/0198129 | A1 | 8/2012 | Van Aken et al. |
| 2012/0224425 | A1 | 9/2012 | Fai et al. |
| 2012/0278530 | A1 | 11/2012 | Ebsen |
| 2012/0324180 | A1 | 12/2012 | Asnaashari et al. |
| 2013/0007380 | A1 | 1/2013 | Seekins et al. |
| 2013/0070507 | A1 | 3/2013 | Yoon |
| 2013/0111112 | A1 | 5/2013 | Jeong et al. |
| 2013/0111289 | A1 | 5/2013 | Zhang et al. |
| 2013/0111290 | A1 | 5/2013 | Zhang et al. |
| 2013/0132650 | A1 | 5/2013 | Choi et al. |
| 2013/0182506 | A1 | 7/2013 | Melik-Martirosian |
| 2013/0219106 | A1 | 8/2013 | Vogan et al. |
| 2013/0232290 | A1 | 9/2013 | Ish et al. |
| 2013/0254498 | A1 | 9/2013 | Adachi et al. |
| 2013/0262745 | A1 | 10/2013 | Lin et al. |
| 2013/0297894 | A1 | 11/2013 | Cohen et al. |
| 2013/0346805 | A1 | 12/2013 | Sprouse et al. |
| 2014/0006688 | A1 | 1/2014 | Yu et al. |
| 2014/0013026 | A1 | 1/2014 | Venkata et al. |
| 2014/0047170 | A1 | 2/2014 | Cohen et al. |
| 2014/0075100 | A1 | 3/2014 | Kaneko et al. |
| 2014/0143637 | A1 | 5/2014 | Cohen et al. |
| 2014/0173239 | A1 | 6/2014 | Schushan |
| 2014/0229655 | A1* | 8/2014 | Goss .............. G06F 12/0246 711/103 |
| 2014/0229656 | A1* | 8/2014 | Goss .............. G06F 12/0246 711/103 |
| 2014/0241071 | A1* | 8/2014 | Goss .............. G11C 7/20 365/189.05 |
| 2014/0244897 | A1* | 8/2014 | Goss .............. G06F 12/0246 711/103 |
| 2014/0244899 | A1 | 8/2014 | Schmier et al. |
| 2014/0258598 | A1 | 9/2014 | Canepa et al. |
| 2014/0281833 | A1 | 9/2014 | Kroeger et al. |
| 2014/0310241 | A1* | 10/2014 | Goyen .............. G06F 17/30174 707/634 |
| 2014/0379988 | A1 | 12/2014 | Lyakhovitskiy et al. |
| 2015/0067172 | A1 | 3/2015 | Ashokan et al. |
| 2015/0074487 | A1 | 3/2015 | Patapoutian et al. |
| 2015/0095558 | A1 | 4/2015 | Kim et al. |
| 2015/0113206 | A1 | 4/2015 | Fitzpatrick et al. |
| 2015/0186278 | A1 | 7/2015 | Jayakumar et al. |
| 2015/0234612 | A1 | 8/2015 | Himelstein et al. |
| 2015/0261473 | A1 | 9/2015 | Matsuyama et al. |
| 2015/0262632 | A1 | 9/2015 | Shelton et al. |
| 2015/0301749 | A1 | 10/2015 | Seo et al. |
| 2015/0331627 | A1 | 11/2015 | Kwak |
| 2016/0026386 | A1 | 1/2016 | Ellis et al. |
| 2016/0034194 | A1 | 2/2016 | Brokhman et al. |
| 2016/0062699 | A1 | 3/2016 | Samuels et al. |
| 2016/0070493 | A1 | 3/2016 | Oh et al. |
| 2016/0071612 | A1 | 3/2016 | Takizawa et al. |
| 2016/0117099 | A1 | 4/2016 | Prins et al. |
| 2016/0117102 | A1 | 4/2016 | Hong et al. |
| 2016/0117105 | A1 | 4/2016 | Thangaraj et al. |
| 2016/0117252 | A1 | 4/2016 | Thangaraj et al. |
| 2016/0170671 | A1 | 6/2016 | Huang |
| 2016/0170831 | A1 | 6/2016 | Lesatre et al. |
| 2016/0179403 | A1 | 6/2016 | Kurotsuchi et al. |
| 2016/0210060 | A1 | 7/2016 | Dreyer |
| 2016/0299689 | A1 | 10/2016 | Kim et al. |
| 2016/0299699 | A1 | 10/2016 | Vanaraj et al. |
| 2016/0299704 | A1 | 10/2016 | Vanaraj et al. |
| 2016/0299724 | A1 | 10/2016 | Vanaraj et al. |
| 2016/0342344 | A1 | 11/2016 | Kankani et al. |
| 2016/0342345 | A1 | 11/2016 | Kankani et al. |
| 2016/0371394 | A1 | 12/2016 | Shahidi et al. |

OTHER PUBLICATIONS

International Search Report and Written Opinion dated Nov. 18, 2015, received in International Patent Application No. PCT/UW2015/039552 which corresponds to U.S. Appl. No. 14/559,183, 11 pages (Ellis).

International Search Report and Written Opinion dated Nov. 9, 2015, received in International Patent Application No. PCT/UW2015/053551, which corresponds to U.S. Appl. No. 14/668,690, 12 pages (Thangaraj).

(56) References Cited

OTHER PUBLICATIONS

International Search Report and Written Opinion dated Nov. 11, 2015, received in International Patent Application No. PCT/UW2015/053582, which corresponds to U.S. Appl. No. 14/659,493, 12 pages (Prins).
Seagate Technology, "SCSI Commands Reference Manual, Rev. C", Product Manual dated Apr. 2010, pp. 211-214.
International Search Report and Written Opinion dated Jul. 4, 2016, received in International Patent Application No. PCT/US2016/028477, which corresponds to U.S. Appl. No. 14/883,540, 11 pages (Hodgdon).
International Search Report and Written Opinion dated Sep. 8, 2016, received in International Patent Application No. PCT/US2016/036716, which corresponds to U.S. Appl. No. 14/925,945, 13 pages (Ellis).
Atmel Data-sheet, "9-to-bit Selectable, ±0.5° C. Accurate Digital Temperature Sensor with Nonvolatile Registers and Serial EEPROM" www.atmel.com/images/Atmel-8854-DTS-AT30TSE752A-754A-758A-Datasheet.pdf, Atmel Data-sheet, Mar. 1, 2011,—Atmel-8854-DTS-AT30TSE752A-754A-758A-Datasheet_102014, 57 pages.

* cited by examiner

Figure 3

DATA INTEGRITY ENHANCEMENT TO PROTECT AGAINST RETURNING OLD VERSIONS OF DATA

RELATED APPLICATIONS

This application claims priority to U.S. Provisional Application No. 62/082,849 filed Nov. 21, 2014, which is hereby incorporated by reference in its entirety.

TECHNICAL FIELD

The disclosed embodiments relate generally to memory systems, and in particular, to enhancing data integrity of a storage system (e.g., comprising one or more flash memory devices) to protect against returning old versions of data.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

Data integrity warrants maintaining and assuring accuracy and consistency of data, and is critical to systems that store, process, and/or retrieve data. Any unintended changes to data as the result of a storage, retrieval or processing operation (e.g., due to unexpected hardware failure) is failure of data integrity. Some data integrity mechanisms (e.g., ECC) protect data against common kinds of internal data corruption, such as undetected bit-flips in memory. However, it is also important for data integrity mechanisms to protect against data integrity failures across longer data paths (e.g., from a data storage device to a host system).

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to enable enhancing data integrity to protect against returning old versions of data. In one aspect, for each logical block specified by a write request from a host, one or more operations are performed, including (1) generating metadata for the logical block, the metadata including a version number, (2) storing the metadata, including the version number, for the logical block in a header of a physical page in which the logical block is stored, and (3) storing the version number for the logical block in a version data structure.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

Figure 3:
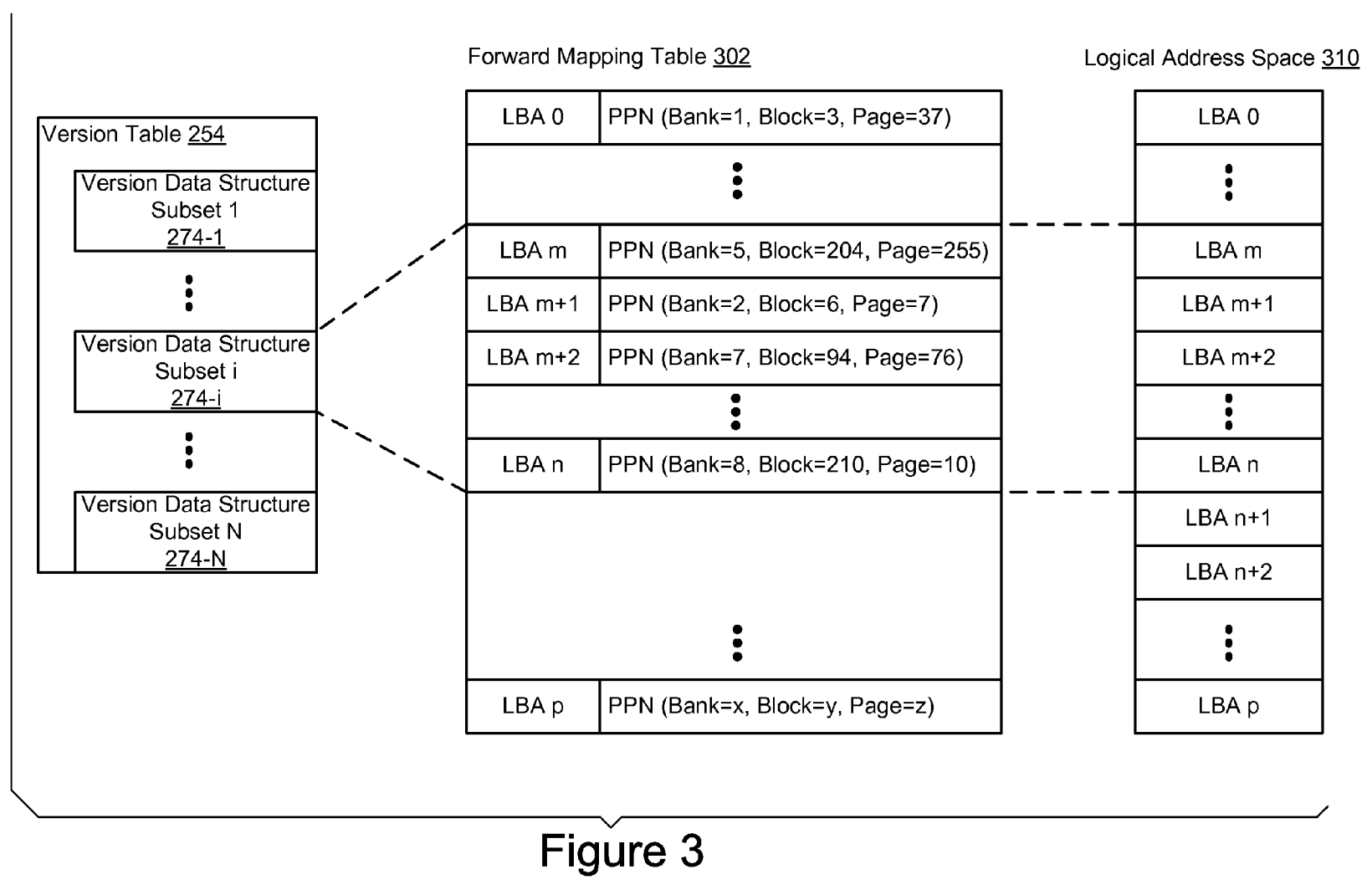

FIG. 3 is a block diagram of a version table, forward mapping table, and logical address space, in accordance with some embodiments.

Figure 1:
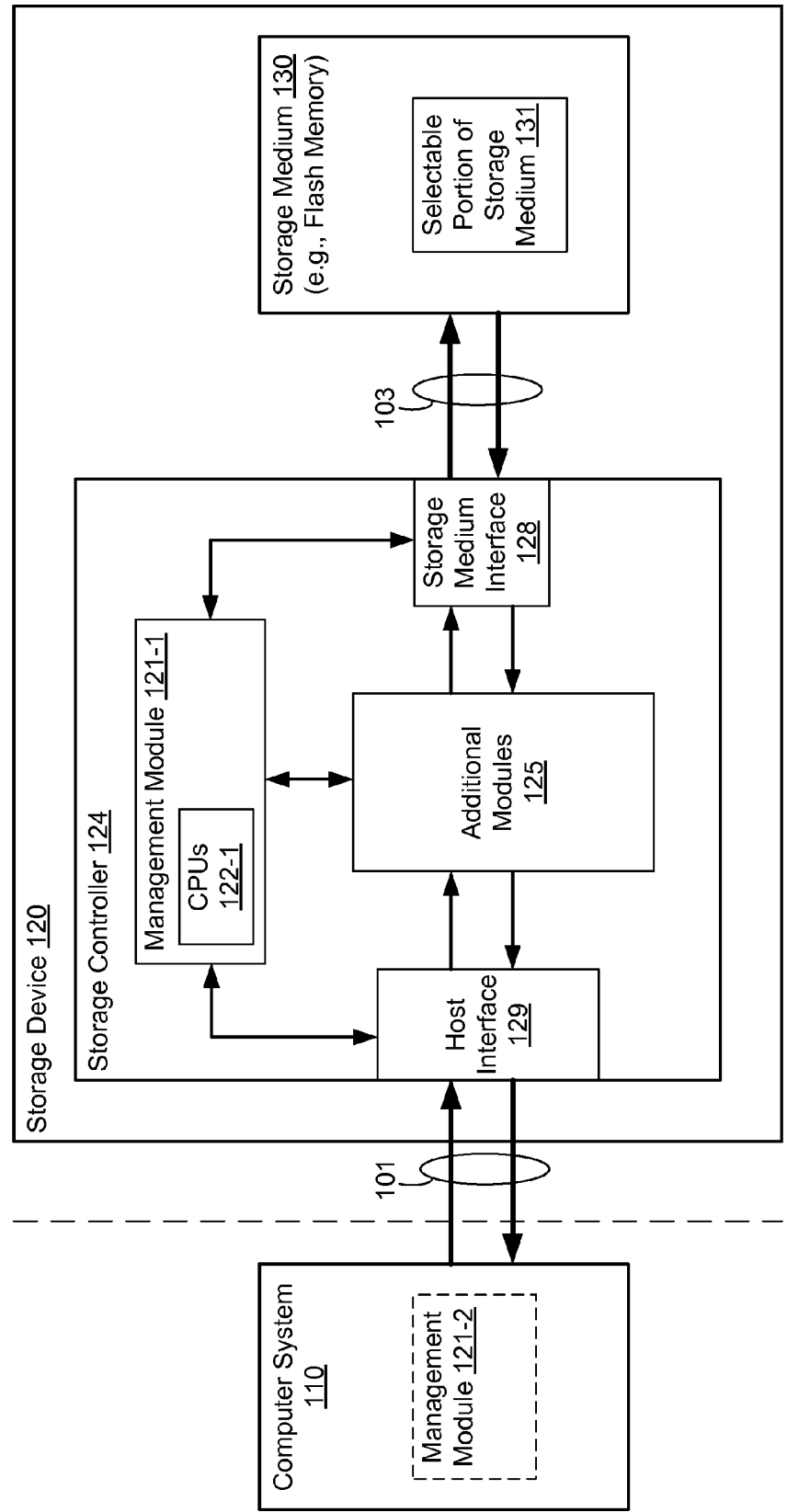
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various embodiments described herein include systems, methods and/or devices used to enable enhancing data integrity to protect against returning old versions of data. Some embodiments include systems, methods and/or devices to perform, for each logical block specified by a write request from a host, one or more operations, including (1) generating metadata for the logical block, the metadata including a version number, (2) storing the metadata, including the version number, for the logical block in a header of a physical page in which the logical block is stored, and (3) storing the version number for the logical block in a version data structure.

(A1) More specifically, some embodiments include a method of enhancing data integrity. In some embodiments, the method includes (1) receiving, at a storage device, a write request from a host, wherein the write request specifies write data for a first set of one or more logical block addresses in a logical address space of the host, (2) mapping, using a mapping table, the first set of one or more logical block addresses associated with the write request to a first set of one or more physical addresses of the storage device, the first set of one or more physical addresses corresponding to one or more physical pages of the storage device, and (3) performing one or more operations for each logical block specified by the first set of one or more logical block addresses, including: (a) generating metadata for the logical block, the metadata including a version number for the logical block, (b) storing the metadata, including the version number, for the logical block in a header of a physical page in which the logical block is stored, and (c) storing the version number for the logical block in a version data structure.

(A2) In some embodiments of the method of A1, performing one or more operations for each logical block specified by the first set of one or more logical block addresses further comprises, in accordance with a determination that the logical block is modified, (1) obtaining an updated version number for the logical block, (2) mapping, using the mapping table, the logical block to a new physical page of the storage device, (3) storing the updated version number for the logical block in a header of the new physical page in which the logical block is stored, and (4) storing the updated version number for the logical block in the version data structure.

(A3) In some embodiments of the method of A2, obtaining an updated version number for the logical block comprises (1) reading the version number for the logical block from the version data structure, and (2) incrementing the version number for the logical block.

(A4) In some embodiments of the method of any of A1 to A3, the method further includes (1) receiving, at the storage device, a read request from the host, wherein the read request specifies a second set of one or more logical block addresses in the logical address space of the host from which to read, (2) mapping, using the mapping table, the second set of one or more logical block addresses associated with the read request to a second set of one or more physical addresses corresponding to one or more physical pages of the storage device, (3) performing one or more operations for each logical block specified by the second set of one or more logical block addresses, including (a) reading the version number for the logical block from the version data structure, (b) reading the version number for the logical block from the header of the physical page in which the logical block is stored, (c) comparing the version number from the version data structure with the version number from the header of the physical page, and (d) in accordance with a determination that the version number from the version data structure is not equivalent to the version number from the header of the physical page, initiating one or more recovery actions, and (4) in accordance with a determination that, for all the logical blocks specified by the second set of one or more logical block addresses, the version number from the version data structure is equivalent to the version number from the header of the physical page, returning data read from the second set of one or more logical block addresses to the host.

(A5) In some embodiments of the method of any of A1 to A4, the mapping table is stored independently from the version data structure.

(A6) In some embodiments of the method of any of A1 to A5, the metadata for the logical block includes a checksum from a Cyclic Redundancy Check (CRC) operation.

(A7) In some embodiments of the method of any of A1 to A6, the metadata for the logical block includes an identification value.

(A8) In some embodiments of the method of any of A1 to A7, the metadata for the logical block includes an application tag.

(A9) In some embodiments of the method of any of A1 to A8, the metadata for the logical block includes a reference tag.

(A10) In some embodiments of the method of any of A1 to A9, the storage device comprises one or more flash memory devices.

(A11) In another aspect, a storage device includes a storage medium, memory distinct from the storage medium, the memory storing a mapping table, the mapping table including information for mapping logical addresses in a logic address space of a host to physical addresses in a physical address space of the storage system, and a storage controller having one or more processors configured to execute instructions in one or more programs, wherein the storage controller is configured to perform or control performance of any of the methods A1 to A10 described herein.

(A12) In some embodiments of the storage device of A11, the storage controller includes a version module for generating the version number for the logical block and storing the version number for the logical block in the version data structure, and a recovery module for initiating one or more recovery actions in accordance with a determination that a version number obtained from the version data structure is not equivalent to a version number obtained from a header of a respective physical page in the storage medium.

(A13) In yet another aspect, any of the methods A1 to A10 described above are performed by a storage device including means for performing any of the methods described herein.

(A14) In yet another aspect, a storage system includes (1) a storage medium (e.g., comprising one or more non-volatile storage devices, such as flash memory devices) (2) one or more processors, and (3) memory (e.g., non-volatile memory or volatile memory in the storage system) storing one or more programs, which when executed by the one or more processors cause the storage system to perform or control performance of any of the methods A1 to A10 described herein.

(A15) In yet another aspect, some embodiments include a non-transitory computer readable storage medium, storing one or more programs configured for execution by one or more processors of a storage device, the one or more programs including instructions for performing any of the methods described herein.

The various embodiments described herein include systems, methods and/or devices used to enable enhancing data integrity to protect against returning old versions of data. Some embodiments include systems, methods and/or devices to perform, for each subset of a mapping table that includes at least one entry corresponding to a logical block specified by a write request from a host, one or more operations, including (1) generating metadata for the subset, the metadata including a version number for the subset, (2) calculating a first Cyclic Redundancy Check (CRC) checksum for the subset, and (3) storing the version number for the subset and the first CRC checksum for the subset in a version data structure.

(B1) More specifically, some embodiments include a method of enhancing data integrity. In some embodiments, the method includes (1) receiving, at a storage device, a write request from a host, wherein the write request specifies write data for a first set of one or more logical block addresses in a logical address space of the host, (2) mapping, using a mapping table, the first set of one or more logical block addresses associated with the write request to a first set of one or more physical addresses of the storage device, wherein the mapping table includes a plurality of subsets, each subset having entries corresponding to a group of contiguous logical blocks in the logical address space of the host, and (3) performing one or more operations for each subset of the mapping table that includes at least one entry corresponding to a logical block specified by the first set of one or more logical block addresses, including: (a) generating metadata for the subset, the metadata including a version number for the subset, (b) calculating a first Cyclic Redundancy Check (CRC) checksum for the subset, and (c) storing the version number for the subset and the first CRC checksum for the subset in a version data structure.

(B2) In some embodiments of the method of B1, performing one or more operations for each subset of the mapping table that includes at least one entry corresponding to a logical block specified by the first set of one or more logical block addresses further comprises, in accordance with a determination that at least one entry of the subset is modified, (1) obtaining an updated version number for the subset, (2) calculating an updated CRC checksum for the subset, and (3) storing the updated version number for the subset and the updated CRC checksum for the subset in the version data structure.

(B3) In some embodiments of the method of B2, obtaining an updated version number for the subset comprises (1) reading the version number for the subset from the version data structure, and (2) incrementing the version number for the subset.

(B4) In some embodiments of the method of any of B1 to B3, the method further includes (1) receiving, at the storage device, a read request from the host, wherein the read request specifies a second set of one or more logical block addresses in the logical address space of the host from which to read, (2) mapping, using the mapping table, the second set of one or more logical block addresses associated with the read request to a second set of one or more physical addresses corresponding to one or more physical pages of the storage device, (3) performing one or more operations for each subset of the mapping table that includes at least one entry corresponding to a logical block specified by the second set of one or more logical block addresses, including: (a) reading the first CRC checksum for the subset from the version data structure, (b) calculating a second CRC checksum for the subset, (c) comparing the second CRC checksum for the subset with the first CRC checksum for the subset, and (d) in accordance with a determination that the second CRC checksum is not equivalent to the first CRC checksum, initiating one or more recovery actions, and (4) in accordance with a determination that, for all the subsets that include at least one entry corresponding to a logical block specified by the second set of one or more logical block addresses, the second CRC checksum is equivalent to the first CRC checksum, returning data from the second set of one or more logical block addresses to the host.

(B5) In some embodiments of the method of any of B1 to B4, the mapping table is stored independently from the version data structure.

(B6) In some embodiments of the method of any of B1 to B5, the storage device comprises one or more flash memory devices.

(B7) In another aspect, a storage device includes a storage medium, memory distinct from the storage medium, the memory storing a mapping table, the mapping table including information for mapping logical addresses in a logic address space of a host to physical addresses in a physical address space of the storage system, and a storage controller having one or more processors configured to execute instructions in one or more programs, wherein the storage controller is configured to perform or control performance of any of the methods B1 to B6 described herein.

(B8) In some embodiments of the storage device of B7, the storage controller includes a version module and a CRC module for generating the version number for the subset and the first CRC checksum for the subset, and for storing the version number for the subset and the first CRC checksum for the subset in the version data structure.

(B9) In yet another aspect, any of the methods B1 to B6 described above are performed by a storage device including means for performing any of the methods described herein.

(B10) In yet another aspect, a storage system includes (1) a storage medium (e.g., comprising one or more non-volatile storage devices, such as flash memory devices) (2) one or more processors, and (3) memory (e.g., non-volatile memory or volatile memory in the storage system) storing one or more programs, which when executed by the one or more processors cause the storage system to perform or control performance of any of the methods B1 to B6 described herein.

(B11) In yet another aspect, some embodiments include a non-transitory computer readable storage medium, storing one or more programs configured for execution by one or more processors of a storage device, the one or more programs including instructions for performing any of the methods B1 to B6 described herein.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the embodiments described herein.

FIG. 1 is a block diagram illustrating data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120, which includes a storage controller 124 and a storage medium 130, and is used in conjunction with or includes a computer system 110. In some embodiments, storage medium 130 is a single flash memory device while in other embodiments storage medium 130 includes a plurality of flash memory devices. In some embodiments, storage medium 130 is NAND-type flash memory or NOR-type flash memory. Further, in some embodiments storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage device 120s.

Computer system 110 is coupled to storage controller 124 through data connections 101. However, in some embodiments computer system 110 includes storage controller 124, or a portion of storage controller 124, as a component and/or a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch screen display, a mouse, a track-pad, a digital camera and/or any number of supplemental devices to add functionality. In some embodiments, computer system 110 does not have a display and other user interface components.

Storage medium 130 is coupled to storage controller 124 through connections 103. Connections 103 are sometimes called data connections, but typically convey commands in addition to data, and optionally convey metadata, error correction information and/or other information in addition to data values to be stored in storage medium 130 and data values read from storage medium 130. In some embodiments, however, storage controller 124 and storage medium 130 are included in the same device (i.e., an integral device) as components thereof. Furthermore, in some embodiments, storage controller 124 and storage medium 130 are embedded in a host device (e.g., computer system 110), such as a mobile device, tablet, other computer or computer controlled device, and the methods described herein are performed, at least in part, by the embedded memory controller. Storage medium 130 may include any number (i.e., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Storage medium 130 is divided into a number of addressable and individually selectable blocks, such as selectable portion 131. In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

As noted above, while data storage densities of non-volatile semiconductor memory devices are generally increasing, a drawback of increasing storage density is that the stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, storage controller 124 includes a management module 121-1 (or management module 121-1-A, shown in more detail in FIG. 2C), a host interface 129, a storage medium I/O interface 128, and additional module (s) 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Similarly, storage medium I/O 128 provides an interface to storage medium 130 though connections 103. In some embodiments, storage medium I/O 128 includes read and write circuitry, including circuitry capable of providing reading signals to storage medium 130 (e.g., reading threshold voltages for NAND-type flash memory).

In some embodiments, management module 121-1 includes one or more processing units (CPUs, also sometimes called processors) 122-1 configured to execute instructions in one or more programs (e.g., in management module 121-1). In some embodiments, the one or more CPUs 122-1 are shared by one or more components within, and in some cases, beyond the function of storage controller 124. Management module 121-1 is coupled to host interface 129, additional module(s) 125 and storage medium I/O 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium I/O 128, host interface 129, and management module 121-1. As an example, additional module(s) 125 may include an error control module to limit the number of uncorrectable errors inadvertently introduced into data during writes to memory or reads from memory. In some embodiments, additional module(s) 125 are executed in software by the one or more CPUs 122-1 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, an error control module, included in additional module(s) 125, includes an encoder and a decoder. In some embodiments, the encoder encodes data by applying an error control code to produce a codeword, which is subsequently stored in storage medium 130. When the encoded data (e.g., one or more codewords) is read from storage medium 130, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in storage medium 130 from computer system 110. The data received by host interface 129 is made available to an encoder (e.g., in additional module(s) 125), which encodes the data to produce one or more codewords. The one or more codewords are made available to storage medium I/O 128, which transfers the one or more codewords to storage medium 130 in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from storage medium 130. Storage controller 124 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., storage medium 130) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell.

The encoding format of the storage media (i.e., TLC, MLC, or SLC and/or a chose data redundancy mechanism) is a choice made when data is actually written to the storage media. Often in this specification there is described an event, condition, or process that is said to set the encoding format, alter the encoding format of the storage media, etc. It should be recognized that the actual process may involve multiple steps, e.g., erasure of the previous contents of the storage media followed by the data being written using the new encoding format and that these operations may be separated in time from the initiating event, condition or procedure.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

In some circumstances when erasure of invalid data is deferred (e.g., garbage collection is performed later as part of background operations), the risk is increased that the invalid data (e.g., an older version of the data) is accidentally accessed. Further, in some embodiments, in order to improve endurance of a storage device of a flash-based storage system, erasure of multiple blocks containing older versions of data are deferred for a long duration (e.g., until a predetermined threshold of free blocks has been reached). In testing, a failure to return the correct (e.g., current) version is called a version mis-comparison error. Although existing end-to-end data integrity mechanisms may protect data against the most common error scenarios such as data displacement and undetected bit-flips in memory, they fail to protect against transfer of older versions of data to a host. The various embodiments described herein include systems, methods and/or devices used to enable enhancing data integrity to protect against returning old versions of data.

Figure 2A:
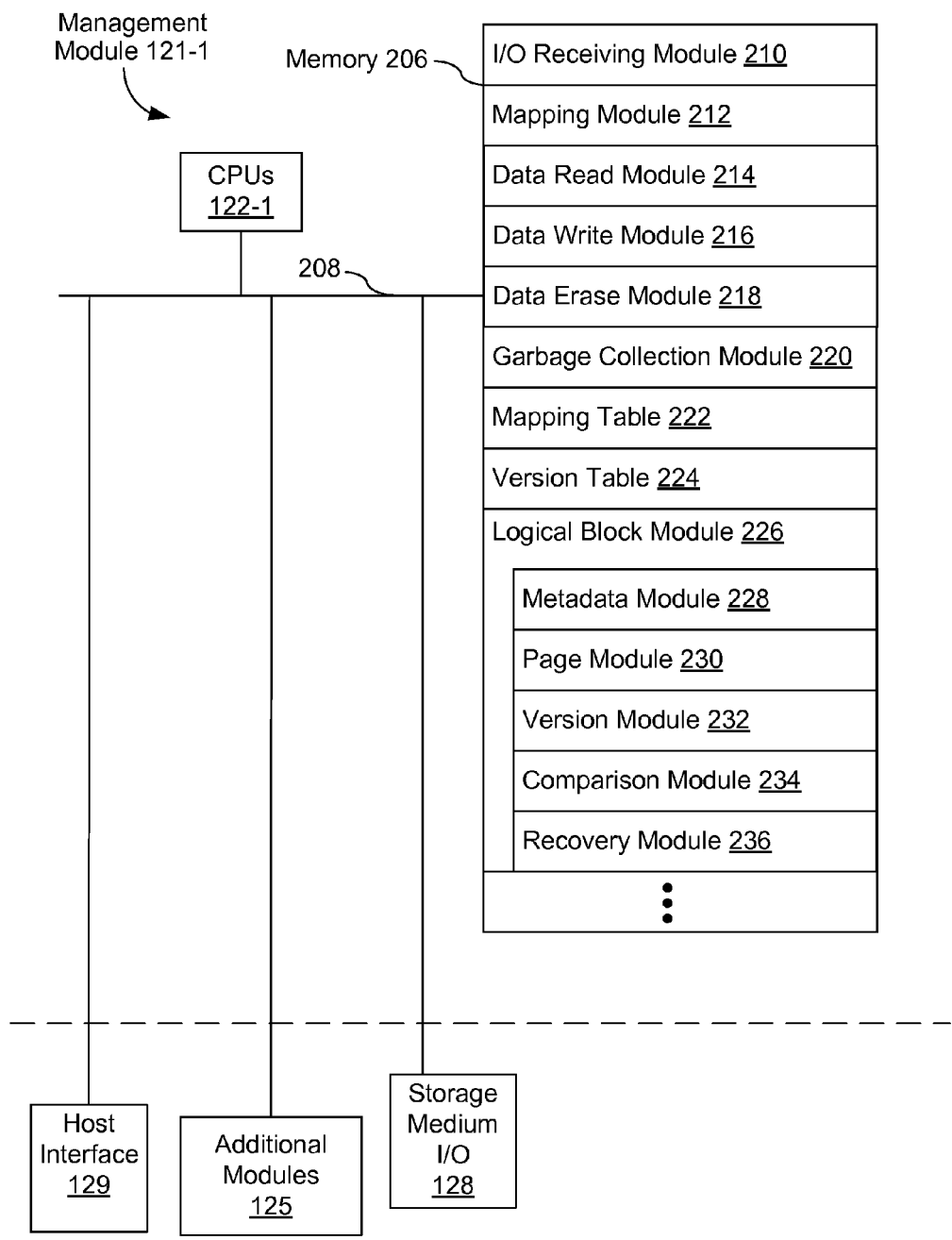
FIG. 2A is a block diagram illustrating an implementation of a management module, in accordance with some embodiments.

FIG. 2A is a block diagram illustrating a management module 121-1, in accordance with some embodiments, as shown in FIG. 1. Management module 121-1 typically includes one or more processing units (sometimes called CPUs or processors) 122-1 for executing modules, programs and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium I/O 128 by the one or more communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

- I/O receiving module 210 that is used for receiving input/output (I/O) requests from a host (e.g., write requests and/or read requests);
- mapping module 212 that is used for mapping, using a mapping table (e.g., mapping table 222), logical addresses (e.g., logical block addresses) to physical addresses;
- data read module 214 that is used for reading data from one or more codewords, pages or blocks in a storage medium (e.g., storage medium 130, FIG. 1);
- data write module 216 that is used for writing data to one or more codewords, pages or blocks in a storage medium (e.g., storage medium 130, FIG. 1);
- data erase module 218 that is used for erasing data from one or more blocks in a storage medium (e.g., storage medium 130, FIG. 1);
- garbage collection module 220 that is used for garbage collection for one or more blocks in a storage medium (e.g., storage medium 130, FIG. 1);
- mapping table 222 that is used for mapping logical addresses to physical addresses (e.g., in some embodiments, mapping table 222 includes forward mapping table 302, FIG. 3);
- version table 224 that includes a collection of data structures (e.g., version data structures 244, FIG. 2B), each data structure storing data for a respective region (e.g., a logical block, a subset, etc.) of a plurality of regions in a logical address space of a host; and
- logical block module 226 that is used for performing one or more operations for one or more logical blocks, optionally including:
  - metadata module 228 that is used for generating metadata for the logical block (e.g., a version number for the logical block);
  - page module 230 that is used for storing the metadata (e.g., generated by metadata module 228) for the logical block in a header of a physical page in which the logical block is stored and/or reading the metadata from the header of the physical page in which the logical block is stored;
  - version module 232 that is used for storing the version number for the logical block in a version data structure (e.g., in version table 224) and/or reading the version number for the logical block from the version data structure;
  - comparison module 234 that is used for comparing the version number for the logical block from the version data structure with the version number for the logical block from the header of the physical page; and
  - recovery module 236 that is used for initiating one or more recovery actions (e.g., in accordance with a determination that the version number from the version data structure is not equivalent to the version number from the header of the physical page).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2A shows management module 121-1 in accordance with some embodiments, FIG. 2A is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

Figure 2B:
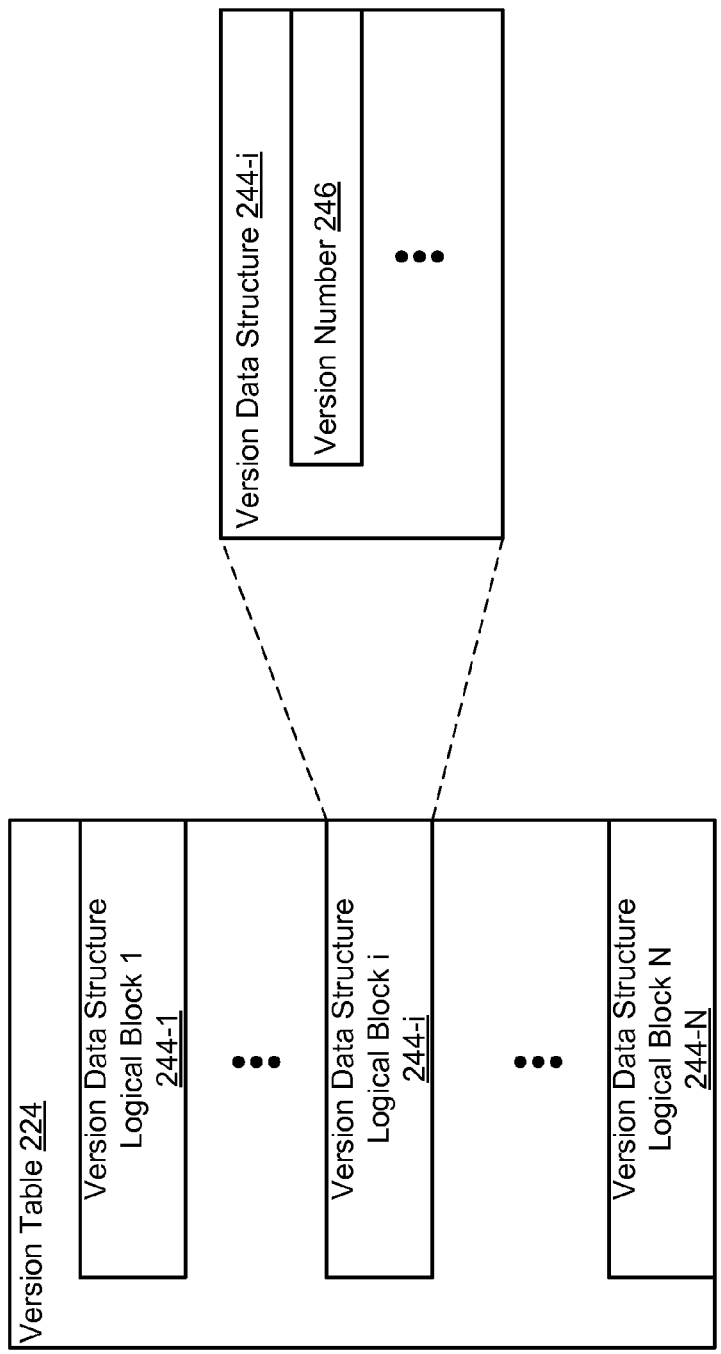
FIG. 2B is a block diagram illustrating an implementation of a version table included in FIG. 2A, in accordance with some embodiments.

FIG. 2B is a block diagram illustrating a version table 224 included in FIG. 2A, in accordance with some embodiments. Version table 224 includes a collection of version data structures 224 that each store data associated with a respective logical block of a plurality of logical blocks in a logical address space, and more specifically a logical block address (LBA) space, of a host (e.g., a respective LBA of a plurality of LBAs in logical address space 310, FIG. 3). An example of a logical address space of a host is described in further detail below with respect to FIG. 3. In some embodiments, the data stored in version data structures 244 includes information regarding the version number (e.g., version number 246) associated with a logical block, for each logical block of a plurality of logical blocks in a logical address space. For example, without limitation, in some embodiments in which a logical address space of a host (e.g., computer system 110, FIG. 1) includes a plurality of LBAs (e.g., LBA 0 through LBA p, FIG. 3), version table 224 includes at least one version data structure for each LBA (e.g., version data structure 244-1 for LBA 0, version data structure 244-2 for LBA 1, etc.). In some embodiments, a version data structure is maintained only for the LBAs that have valid data. In some embodiments, a version data structure is maintained for a subset of all the LBAs in a logical address space of a host. In some embodiments, a version data structure is maintained for all of the LBAs in a logical address space of a host. In some embodiments, version table 224 is maintained in one or more data structures stored on a storage device (e.g., storage device 120, FIG. 1). In some embodiments, the storage device determines the version number for the LBA and stores the version number (e.g., version number 246) in version table 224. In some embodiments, version table 224 is maintained in one or more data structures stored on a host (e.g., computer system 110, FIG. 1). In some embodiments, the host determines the version number for the LBA and stores the version number (e.g., version number 246) in version table 224. In some embodiments, one or more operations performed to gather data, make determinations based on the data and/or generate metadata are performed at the host (e.g., computer system 110, FIG. 1), and relevant information is transmitted to a storage device (e.g., storage device 120, FIG. 1).

Version data structure 244-i illustrates an implementation of a version data structure for a respective LBA (e.g., LBA m, FIG. 3), in accordance with some embodiments. In some embodiments, version data structure 244-i stores the following data, or a subset or superset thereof:

version number 246 that is used for tracking a current version number for the respective LBA.

Figure 2C:
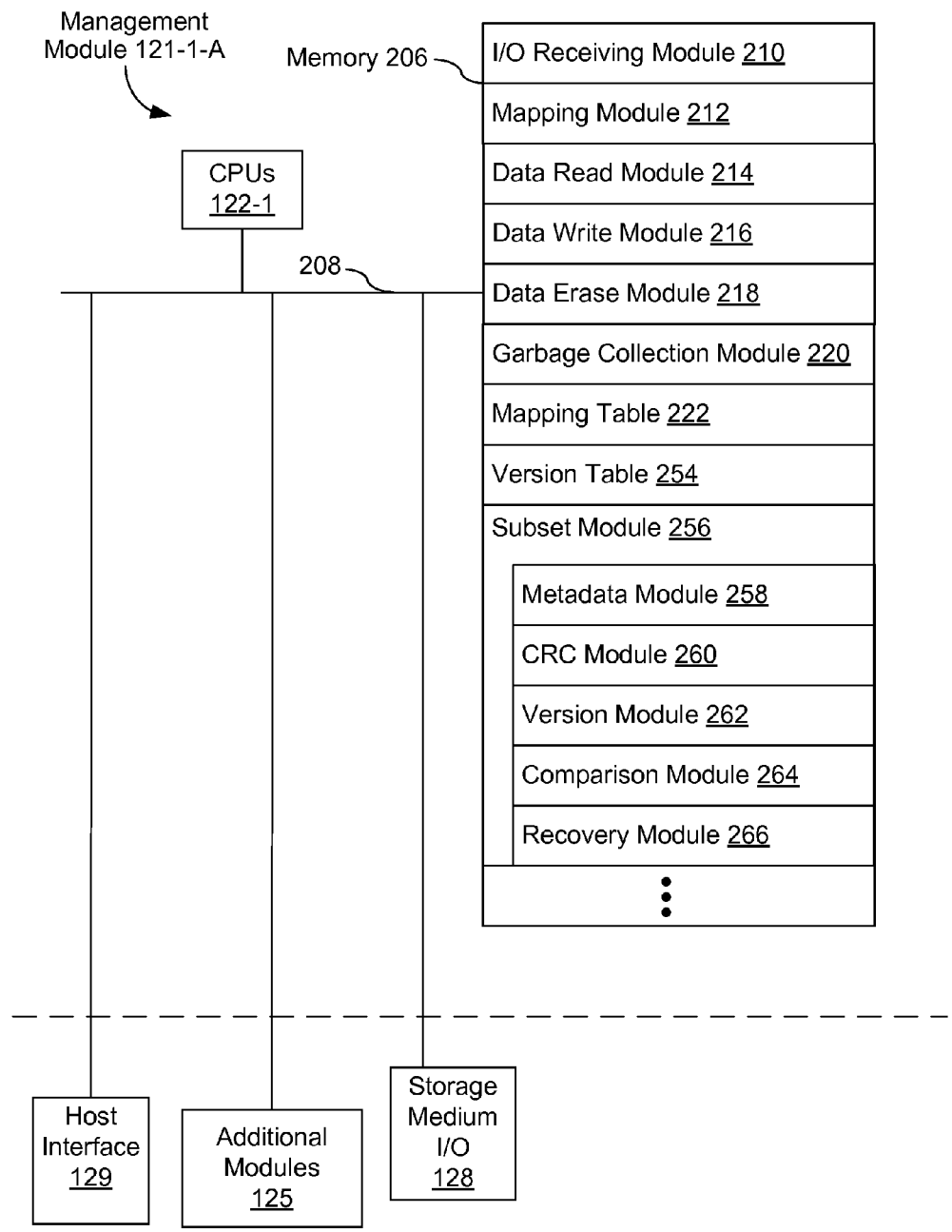
FIG. 2C is a block diagram illustrating an implementation of a management module, in accordance with some embodiments.

FIG. 2C is a block diagram illustrating a management module 121-1-A, in accordance with some embodiments, as shown in FIG. 1. Management module 121-1-A as shown in FIG. 2C has some components that are the same as in management module 121-1 shown in FIG. 2A, but also has some components that are different. Management module 121-1-A typically includes one or more processing units (sometimes called CPUs or processors) 122-1-A for executing modules, programs and/or instructions stored in memory 206 and thereby performing processing operations, memory 206 (sometimes called controller memory), and one or more communication buses 208 for interconnecting these components. The one or more communication buses 208 optionally include circuitry (sometimes called a chipset) that interconnects and controls communications between system components. Management module 121-1-A is coupled to host interface 129, additional module(s) 125, and storage medium I/O 128 by the one or more communication buses 208. Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium. In some embodiments, memory 206, or the non-transitory computer readable storage medium of memory 206 stores the following programs, modules, and data structures, or a subset or superset thereof:

I/O receiving module 210 that is used for receiving input/output (I/O) requests from a host (e.g., write requests and/or read requests);

mapping module 212 that is used for mapping, using a mapping table (e.g., mapping table 222), logical addresses to physical addresses;

data read module 214 that is used for reading data from one or more codewords, pages or blocks in a storage medium (e.g., storage medium 130, FIG. 1);

data write module 216 that is used for writing data to one or more codewords, pages or blocks in a storage medium (e.g., storage medium 130, FIG. 1);

data erase module 218 that is used for erasing data from one or more blocks in a storage medium (e.g., storage medium 130, FIG. 1);

garbage collection module 220 that is used for garbage collection for one or more blocks in a storage medium (e.g., storage medium 130, FIG. 1);

mapping table 222 that is used for mapping logical addresses to physical addresses (e.g., in some embodiments, mapping table 222 includes forward mapping table 302, FIG. 3);

version table 254 that includes a collection of data structures (e.g., version data structures 274, FIG. 2D), each data structure storing data for a respective subset of a plurality of subsets (e.g., subsets 1 to N, FIG. 3) of a mapping table (e.g., mapping table 222); and subset module 256 that is used for performing one or more operations for one or more subsets of a plurality of subsets (e.g., subsets 1 to N, FIG. 3) of a mapping table (e.g., mapping table 222), optionally including:

metadata module 258 that is used for generating metadata for the subset (e.g., a version number for the subset);

CRC module 260 that is used for calculating a Cyclic Redundancy Check (CRC) checksum for the subset;

version module 262 that is used for storing the version number and/or the CRC checksum for the subset in a version data structure (e.g., in version table 254) and/or used for reading the version number and/or the CRC checksum for the subset from the version data structure;

comparison module 264 that is used for comparing the CRC checksum for the subset from the version data structure with a second CRC checksum (e.g., a calculated CRC checksum) for the subset; and recovery module 266 that is used for initiating one or more recovery actions (e.g., in accordance with a determination that the CRC checksum from the version data structure is not equivalent to the second CRC checksum).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2C shows management module 121-1-A in accordance with some embodiments, FIG. 2C is intended more as a functional description of the various features which may be present in management module 121-1-A than as a structural schematic of the embodiments described herein. In practice, and as recognized by those of ordinary skill in the art, the programs, modules, and data structures shown separately could be combined and some programs, modules, and data structures could be separated.

Figure 2D:
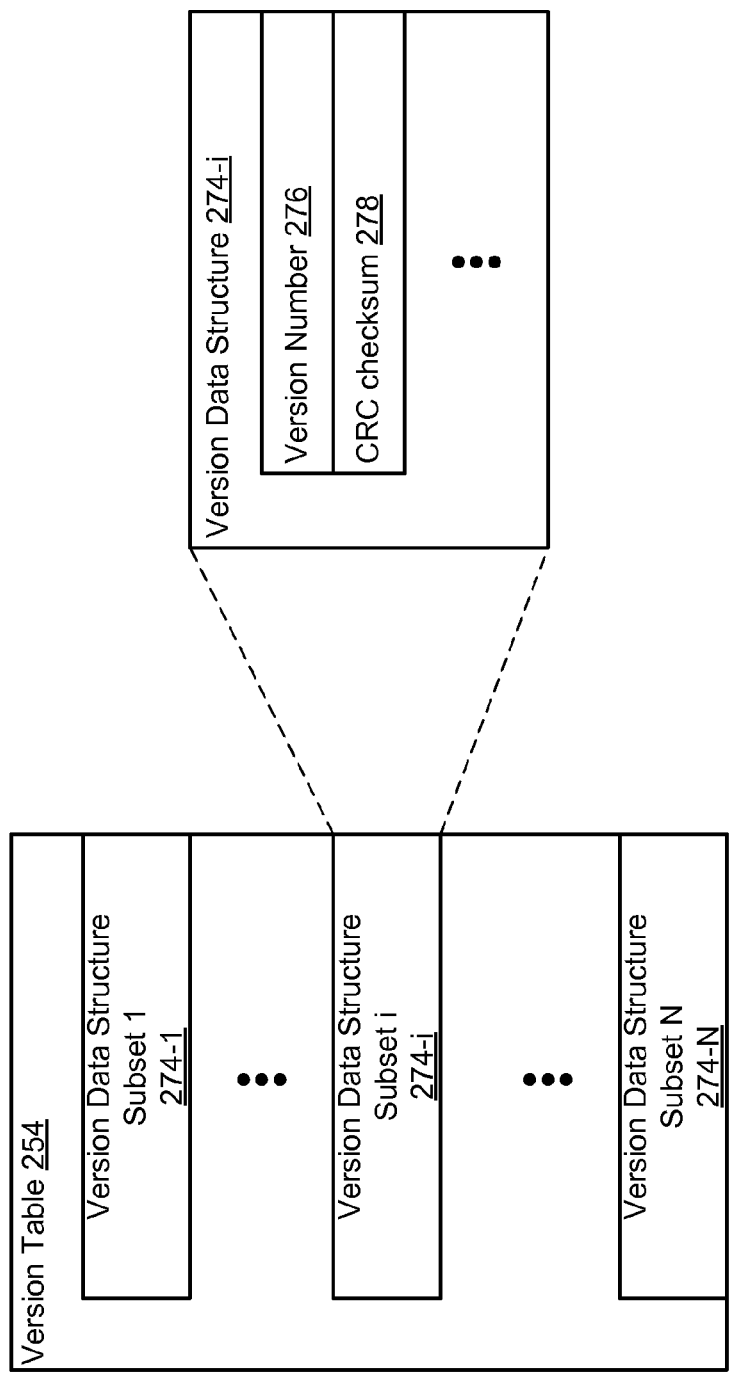
FIG. 2D is a block diagram illustrating an implementation of a version table included in FIG. 2C, in accordance with some embodiments.
Figure 4A:
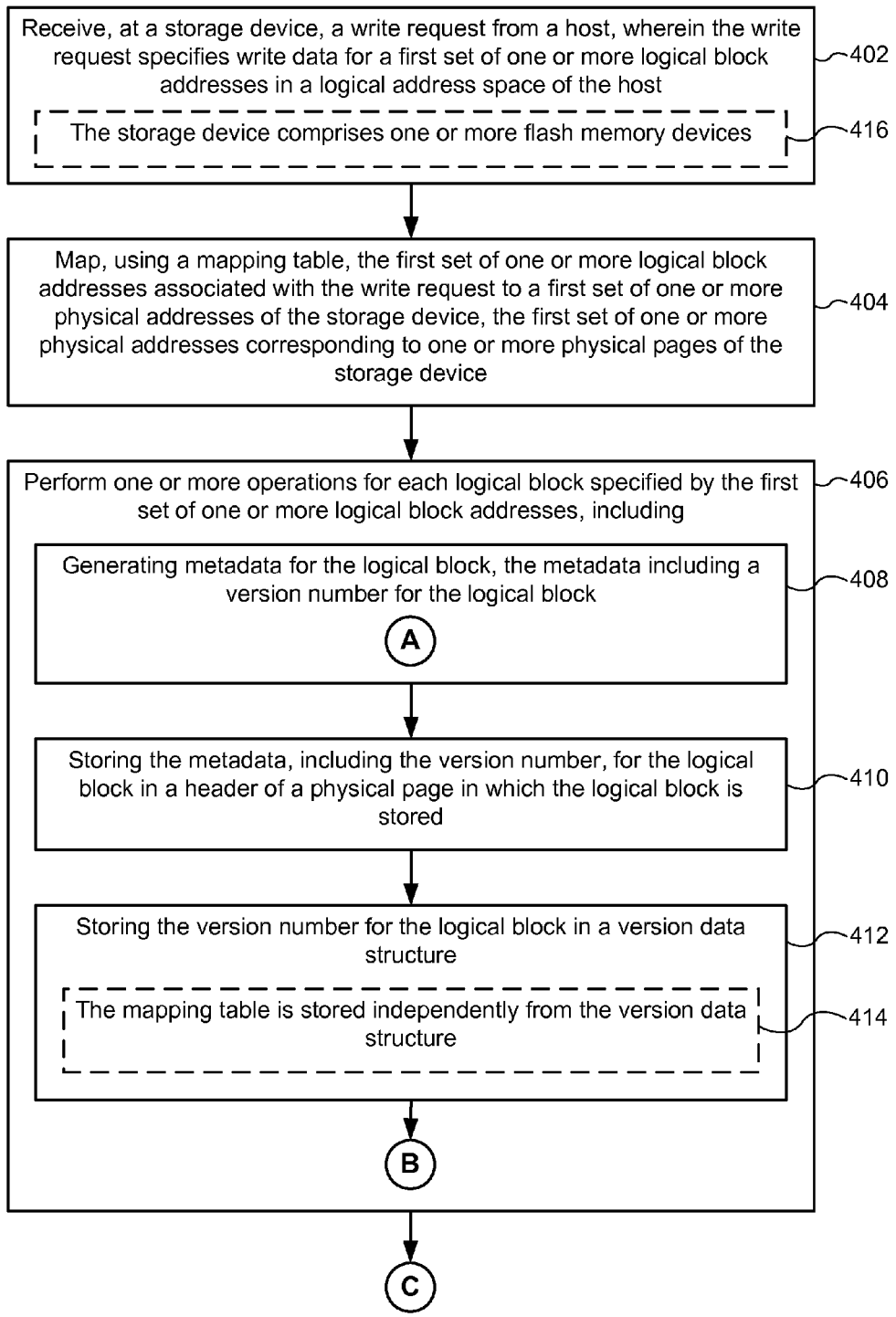
FIGS. 4A-4D illustrate a flowchart representation of a method of enhancing data integrity, in accordance with some embodiments.
Figure 4B:
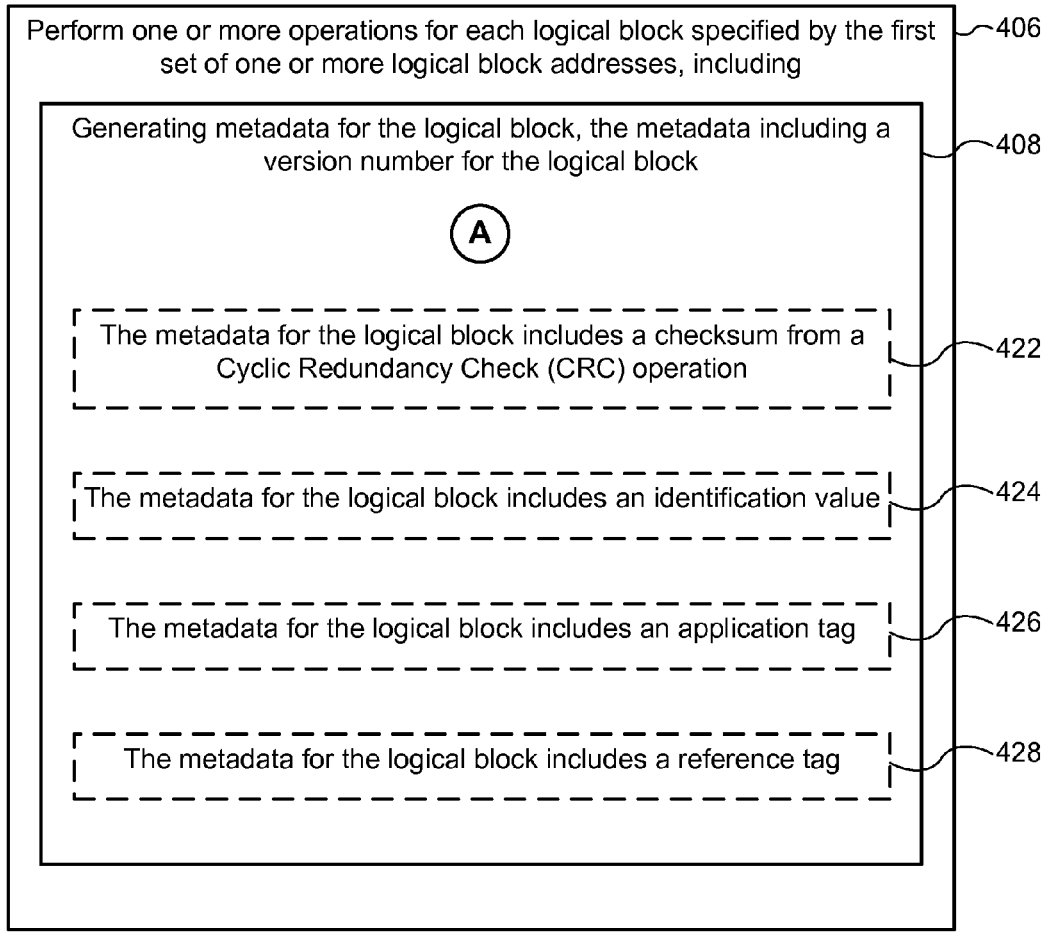
Figure 4C:
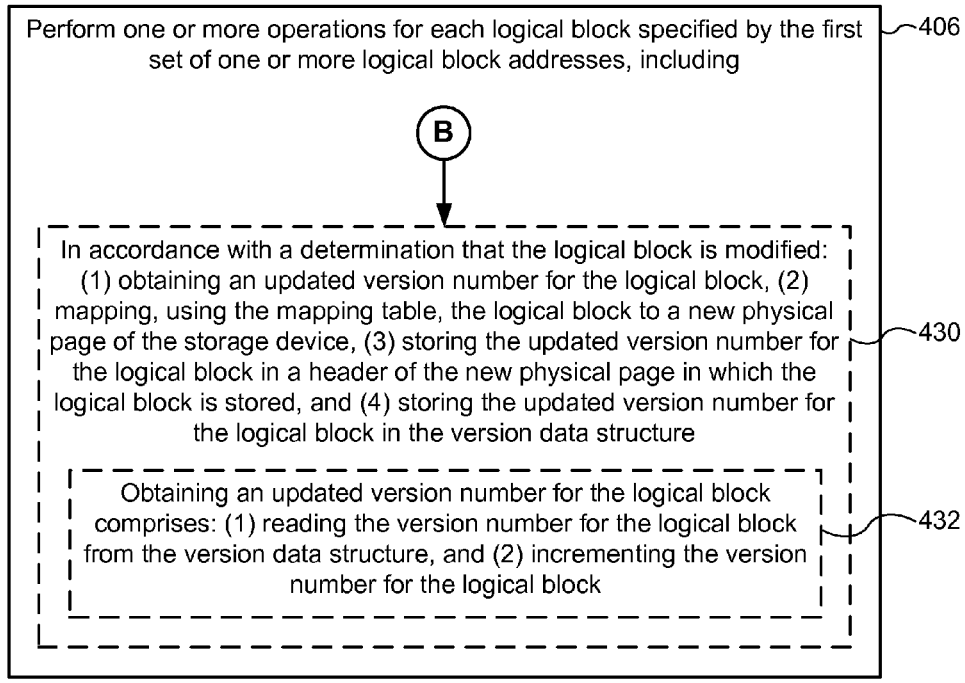
Figure 4D:
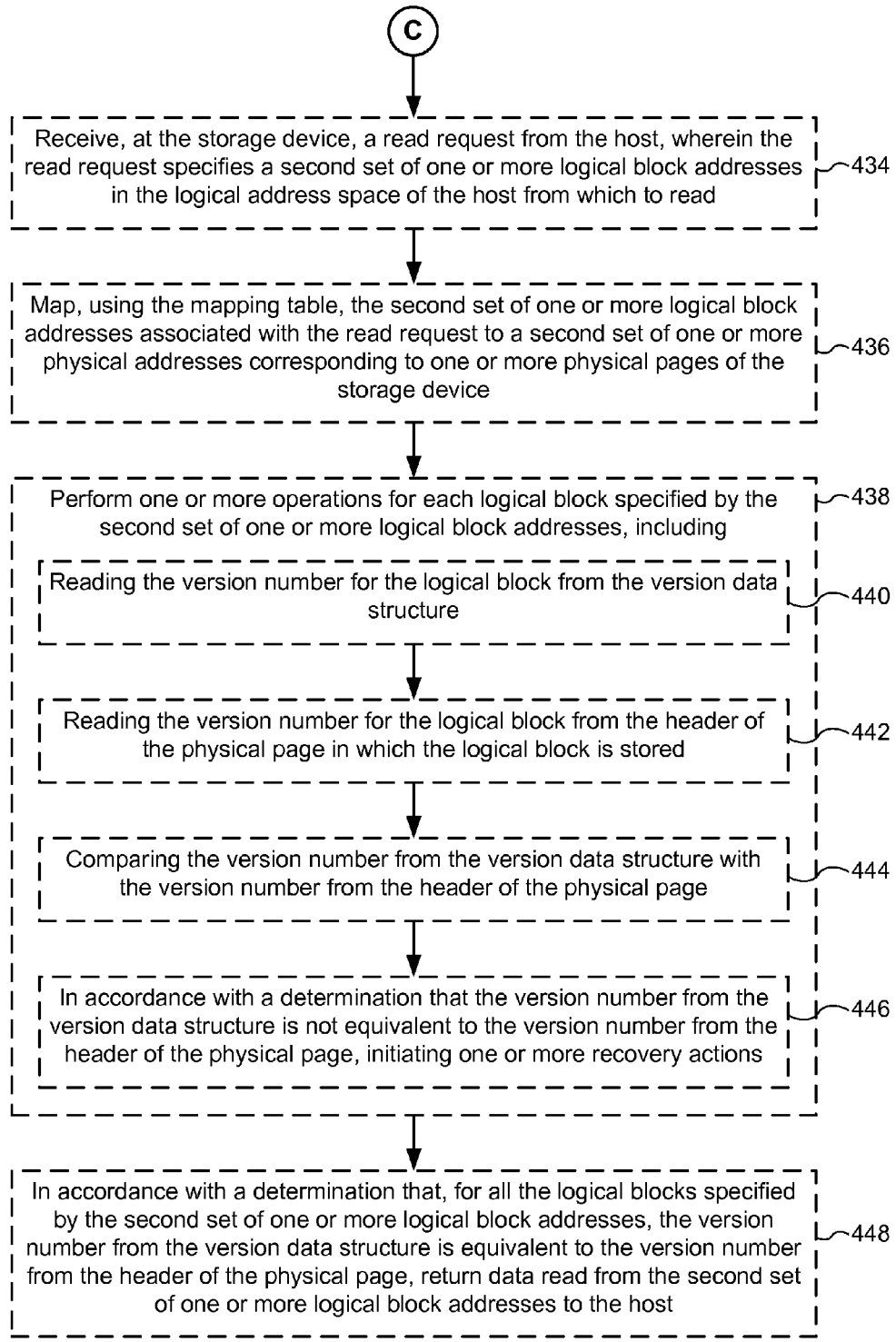

FIG. 2D is a block diagram illustrating a version table 254 included in FIG. 2C, in accordance with some embodiments. Version table 254 includes a collection of version data structures 274 that each store data associated with a respective subset of a plurality of subsets of a mapping table (e.g., forward mapping table 302, FIG. 3). An example of a mapping table is described in further detail below with respect to FIG. 3. In some embodiments, the data stored in version data structures 274 includes, for each subset of a plurality of subsets of a mapping table, information regarding the version number (e.g., version number 276) associated with a respective subset and a CRC checksum (e.g., CRC checksum 278) for the respective subset. For example, without limitation, in some embodiments in which a mapping table for a logical address space of a host includes a plurality of subsets (e.g., subset 1 through subset N), version table 254 includes at least one version data structure for each subset (e.g., version data structure 274-1 for subset 1, version data structure 274-1 for subset 2, etc). In some embodiments, a version data structure is maintained only for the subsets of the mapping table that have valid data. In some embodiments, a version data structure is maintained for some, but less than all, of the subsets of the mapping table. In some embodiments, a version data structure is maintained for all of the subsets of the mapping table. In some embodiments, version table 254 is maintained in one or more data structures stored on a storage device (e.g., storage device 120, FIG. 1). In some embodiments, the storage device determines the version number and/or the CRC checksum for the subset and stores the data in version table 254. In some embodiments, version table 254 is maintained in one or more data structures stored on a host (e.g., computer system 110, FIG. 1). In some embodiments, the host determines the version number and/or the CRC checksum for the subset and stores the data in version table 254. In some embodiments, one or more operations performed to gather data, make determinations based on the data and/or generate metadata are performed at the host (e.g., computer system 110, FIG. 1), and relevant information is transmitted to a storage device (e.g., storage device 120, FIG. 1).

Version data structure 274-i illustrates an implementation of a version data structure for a respective subset (e.g., subset i) of a plurality of subsets of a mapping table (e.g., forward mapping table 302, FIG. 3), in accordance with some embodiments. In some embodiments, version data structure 274-i stores the following data, or a subset or superset thereof:

version number 276 that is used for tracking a current version number for the respective subset; and CRC checksum 278 that is used for tracking a CRC checksum for the respective subset.

FIG. 3 is a block diagram of version table 254, forward mapping table 302, and logical address space 310, in accordance with some embodiments. In some embodiments, a logical address is the address at which an item (e.g., a file or other data) resides from the perspective of a host (e.g., computer system 110, FIG. 1). In some embodiments, a logical address (e.g., in logical address space 310) differs from a physical address in a physical address space due to the operation of a mapping function or address translator (e.g., a function or module that includes mapping module 212 or mapping table 222, FIGS. 2A and 2C, or forward mapping table 302, FIG. 3). In some embodiments, logical addresses are implemented as logical block addresses (LBA's), which are mapped to physical flash addresses (e.g., physical page numbers (PPN's). Physical addresses typically include portions, such as bank, block and page, corresponding to multiple levels of a memory hierarchy. In some embodiments, forward mapping table 302 is used to implement mapping table 222 in management module 121-1.

In some embodiments, forward mapping table 302 is used to translate a logical block address (LBA) from the perspective of a host (e.g., computer system 110, FIG. 1A) to a physical address in a physical address space of non-volatile memory in a storage device (e.g., storage device 120, FIG. 1). In some embodiments, an LBA is the address of the smallest unit of stored data that is addressable by a host (e.g., 512 B or 4096 B). In some embodiments, LBAs are a sequence of integers organized in numerical order in the logical address space. In some embodiments, LBAs are integers chosen from a logical address space but need not be contiguous. For example, in implementations that utilize a sparse logical address space, the amount of addressable space is governed by a limit on the number of logical addresses that can be allocated, but those logical addresses are distributed over a larger address space than the maximum number of logical addresses that can be allocated (e.g., to a host or a set of hosts or clients).

In some embodiments, forward mapping table 302 is stored in memory associated with the storage device (e.g., in memory 206, as part of mapping table 222, FIGS. 2A and 2C). In some embodiments, a physical address is a physical page number (PPN), including a bank number, a block number, and a page number. In the example shown in FIG. 3, LBA 0 is mapped to bank 1, block 3, page 37 of a physical address space. A physical address space (e.g., in storage medium 130, FIG. 1) includes a plurality of non-volatile memory blocks. As described above, each non-volatile memory block in the physical address space of a storage device typically includes a plurality of pages, where each page is typically an instance of the smallest individually accessible (e.g., readable or writable) portion of a block. Although FIG. 3 illustrates one example of a logical address to physical address mapping, in other embodiments, different mappings may be used. For example, in some embodiments, each of the logical address entries corresponds to multiple (e.g., eight) logical addresses (e.g., 8 LBAs per logical address entry). In some embodiments, forward mapping table 302 need not contain contiguous LBA addresses and may be organized in any manner that facilitates efficient lookup operations, e.g., hash table, binary tree, content addressable memory, and others.

In some embodiments, a logical address space corresponds to a plurality of subsets in a mapping table (e.g., subset 1 through subset N), and each subset of the mapping table includes one or more LBAs. In some embodiments, a subset corresponds to a set of contiguous mapping entries in a mapping table. For example, in FIG. 3, subset i corresponds to mapping entries for LBA m to LBA n in forward mapping table 302.

In some embodiments, as described above with respect to FIG. 2B, version data is maintained for one or more LBAs of a plurality of LBAs in the logical address space. In some embodiments, the version data for a respective LBA (e.g., LBA m) is maintained in a version data structure (e.g., version data structure 244, FIG. 2B), which stores data corresponding to the version for the respective LBA. For example, in some embodiments, a version number is maintained (e.g., in version data structure 244-i), and if the data corresponding to logical block i changes, the version number (e.g., version number 246 in version data structure 244-i) for logical block i is updated. In some embodiments, the version number is updated by incrementing the version number for the logical block. In some embodiments, the version number is updated by modifying the version number to yield a predictable unique number.

In some embodiments, as described above with respect to FIG. 2D, version data is maintained for one or more subsets of a plurality of subsets in a mapping table (e.g., forward mapping table 302). In some embodiments, the version data for a respective subset (e.g., subset i) is maintained in a version data structure (e.g., version data structure 274-i, FIGS. 2B and 3), which stores data corresponding to the version for the respective subset. For example, in some embodiments, a version number is maintained (e.g., in version data structure 274-i), and if the data corresponding any logical block in subset i changes, the version number (e.g., version number 276 in version data structure 274-i) for subset i is updated. In some embodiments, the version number is updated by incrementing the version number for the subset. In some embodiments, the version number is updated by modifying the version number to yield a predictable unique number. In some embodiments, an updated Cyclic Redundancy Check (CRC) checksum is calculated over the set of mapping entries in the respective subset and stored in the version data structure (e.g., using CRC checksum 278 in version data structure 274-i, FIG. 2D).

FIGS. 4A-4D illustrate a flowchart representation of a method 400 of enhancing data integrity, in accordance with some embodiments. At least in some embodiments, method 400 is performed by a storage device (e.g., storage device 120, FIG. 1) or one or more components of the storage device (e.g., storage controller 124 and/or storage medium 130, FIG. 1), wherein the storage device is operatively coupled with a host system (e.g., computer system 110, FIG. 1). In some embodiments, method 400 is governed by instructions that are stored in a non-transitory computer readable storage medium and that are executed by one or more processors of a device, such as the one or more processing units (CPUs) 122-1 of management module 121-1, shown in FIGS. 1 and 2A. In some embodiments, method 400 is performed by a storage system (e.g., data storage system 100, FIG. 1) or one or more components of the storage system (e.g., computer system 110 and/or storage device 120, FIG. 1). In some embodiments, some of the operations of method 400 are performed at a host (e.g., computer system 110, FIG. 1) and information is transmitted to a storage device (e.g., storage device 120, FIG. 1). In some embodiments, method 400 is governed, at least in part, by instructions that are stored in a non-transitory computer readable storage medium and that are executed by one or more processors of a host (not shown in FIG. 1). For ease of explanation, the following describes method 400 as performed by a storage device (e.g., storage device 120, FIG. 1). However, those skilled in the art will appreciate that in other embodiments, one or more of the operations described in method 400 are performed by a host (e.g., computer system 110, FIG. 1).

A storage device (e.g., storage device 120, FIG. 1), receives (402) a write request from a host (e.g., computer system 110, FIG. 1), wherein the write request specifies write data, for a first set of one or more logical addresses (e.g., logical block addresses) in a logical address space of the host, to be written to non-volatile memory (e.g., storage medium 130, FIG. 1) in the storage device. In some embodiments, an I/O receiving module (e.g., I/O receiving module 210, FIG. 2A) is used to receive, at a storage device, a write request from a host, wherein the write request specifies write data for a first set of one or more logical block addresses in a logical address space of the host, as described above with respect to FIG. 2A.

In some embodiments, the storage device includes (416) one or more flash memory devices. In some embodiments, the storage device includes a storage medium (e.g., storage medium 130, FIG. 1), and the storage medium includes one or more non-volatile storage devices, such as flash memory devices. In some embodiments, the storage medium (e.g., storage medium 130, FIG. 1) is a single flash memory device, while in other embodiments the storage medium includes a plurality of flash memory devices. For example, in some embodiments, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., storage medium 130, FIG. 1) includes NAND-type flash memory or NOR-type flash memory. In other embodiments, the storage medium comprises one or more other types of non-volatile storage devices.

The storage device maps (404), using a mapping table (e.g., forward mapping table 302, FIG. 3), the first set of one or more logical block addresses associated with the write request to a first set of one or more physical addresses of the storage device. The first set of one or more physical addresses correspond to one or more physical pages of the storage device. In some embodiments, a mapping module (e.g., mapping module 212, FIG. 2A) is used to map, using a mapping table, the first set of one or more logical block addresses associated with the write request to a first set of one or more physical addresses of the storage device, the first set of one or more physical addresses corresponding to one or more physical pages of the storage device, as described above with respect to FIG. 2A.

The storage device performs (406) one or more operations for each logical block specified by the first set of one or more logical block addresses, including: (1) generating (408) metadata for the logical block, the metadata including a version number for the logical block, (2) storing (410) the metadata, including the version number, for the logical block in a header of a physical page in which the logical block is stored, and (3) storing (412) the version number for the logical block in a version data structure. In some embodiments, a logical block module (e.g., logical block module 226, FIG. 2A), including a metadata module (e.g., metadata module 228, FIG. 2A), a page module (e.g., page module 230, FIG. 2A), and/or a version module (e.g., version module 232, FIG. 2A) are used to perform one or more of the aforementioned operations (408, 410, 412) for each logical block specified by the first set of one or more logical block addresses (specified by the write request received at 402).

In some embodiments, some (e.g., one, some, or all) of the operations performed for each logical block specified by the first set of one or more logical block addresses are performed at the storage device (e.g., storage device 120, FIG. 1). In some embodiments, some (e.g., one, some, or all) of the operations performed for each logical block specified by the first set of one or more logical block addresses are performed at the host (e.g., computer system 110, FIG. 1). In some embodiments, one or more of the operations are performed at the storage device (e.g., storage device 120, FIG. 1) and one or more of the operations are performed at the host (e.g., computer system 110, FIG. 1). For ease of explanation, the description herein describes embodiments wherein the one or more operations are performed at the storage device. However, in some embodiments, one or more of the operations are performed at the host and data, signals and/or commands are transmitted to the storage device as needed.

As noted above, the storage device generates (408) metadata for the logical block, the metadata including a version number for the logical block. In some embodiments, if the logical block is being written for the first time, the storage device generates metadata for the logical block, the metadata including an initial version number (e.g., version number 1) for the logical block. For example, if LBA m of logical address space 310 (FIG. 3) was previously unused and now a write request from a host (e.g., computer system 110, FIG. 1) specifies write data for LBA m, the storage device generates metadata for LBA m, the metadata including a version number (e.g., version number 1) for LBA m. The purpose of the version number is to verify, when responding to a read request, that data sent to the host (e.g., computer system 110, FIG. 1) is the current version of the data and not an invalid (e.g., stale or older) version of the data. In some embodiments, a metadata module (e.g., metadata module 228, FIG. 2A) is used to generate metadata for the logical block, the metadata including a version number for the logical block, as described above with respect to FIG. 2A.

In some embodiments, the metadata for the logical block includes (422) a checksum from a Cyclic Redundancy Check (CRC) operation. In some embodiments, the metadata includes a CRC value corresponding to a checksum calculated from data that includes data for the logical block. Using the example of LBA m from above, in some embodiments, the metadata includes a CRC-16 checksum calculated on the data associated with LBA m.

In some embodiments, the metadata for the logical block includes (424) an identification value. In some embodiments, the identification value is the logical block address for the logical block. For example, for LBA 80, in some embodiments, the metadata for LBA 80 includes an identification value of 80.

In some embodiments, the metadata for the logical block includes (426) an application tag. In some embodiments, the application tag includes an opaque data field that is not interpreted by a controller (e.g., storage controller 124, FIG. 1) of the storage device. In some embodiments, the application tag is constant for the entire I/O command. For example, in some embodiments, all of the logical blocks associated with a write command have the same application tag. In some embodiments, the application tag is determined by a host application (e.g., on computer system 110, FIG. 1). In some embodiments, the application tag is 2 bytes long (e.g., per T10 Protection Information standards).

In some embodiments, the metadata for the logical block includes (428) a reference tag. In some embodiments, the reference tag for a given logical block is computed by adding the reference tag in the command context to the logical block offset of the given logical block. In some embodiments, the reference tag is 4 bytes long (e.g., per T10 Protection Information standards). In some embodiments, the reference tag protects against data displacement.

As mentioned above, the storage device stores (410) the metadata, including the version number, for the logical block in a header of a physical page in which the logical block is stored. For example, if LBA m (FIG. 3) is included in the write request of operation 402, the storage device stores the metadata for LBA m, including the version number (e.g., version number 1) for LBA m in a header of a physical page (e.g., Bank 5, Block 204, Page 255) in which LBA m is stored. In some embodiments, the space provided for the version number is large enough to store what is reasonably expected to be the largest version value of any page (e.g., associated with a logical block), so that the version stored in the header of the physical page remains unique over time. Alternatively, in some embodiments, the space provided for the version number is considerably smaller (e.g., a few bits) than what would be needed to store the largest reasonably expected version number. As a result, values of the version number will not be unique for the full life of the device, but will roll-over, perhaps several times. However, in these embodiments, the number of bits provided for the version number is large enough such that there is no chance that a stale value could be mistaken for a current value. In some embodiments, a page module (e.g., page module 230, FIG. 2A) is used to store the metadata, including the version number, for the logical block in a header of a physical page in which the logical block is stored, as described above with respect to FIG. 2A.

As mentioned above, the storage device stores (412) the version number for the logical block in a version data structure. Using the example of LBA m from above, the storage devices stores the version number (e.g., version number 1) for LBA m in a version data structure (e.g., in version number 246 of version data structure 244 corresponding to LBA m, FIG. 2B). In some embodiments, the version number stored in the version data structure is the expected version of the page as stored in operation 410. By comparing the version number in the header of a page against the expected version number stored in the version data structure, it is possible to detect, when a page is read, whether the version number in the header of the page is the current version number. In some embodiments, the version data structure is stored in non-volatile memory. Although the examples herein describe a separate version data structure for each logical block, those skilled in the art will appreciate that the embodiments described herein may be extended to other ways to store the version number for the logical block (e.g., the expected version number). For example, in a simple form, the stored information may be kept as a table with as many entries as there are pages in the host data space, where each entry has the current (e.g., expected) version number for the page. In some embodiments, a version module (e.g., version module 232, FIG. 2A) is used to store the version number for the logical block in a version data structure, as described above with respect to FIG. 2A.

In some embodiments, the mapping table is (414) stored independently from the version data structure. As a result, both are unlikely to suffer the same logical error mechanisms or loss mechanisms. For example, when the mapping table is stored independently from the version data structure, a mistake in handling the mapping table is unlikely to also be made in the version data structure.

In some embodiments, in accordance with a determination that the logical block is modified (430), the storage device (1) obtains an updated version number for the logical block, (2) maps, using the mapping table, the logical block to a new physical page of the storage device, (3) stores the updated version number for the logical block in a header of the new physical page in which the logical block is stored, and (4) stores the updated version number for the logical block in the version data structure. In some embodiments, the logical block is modified by a subsequent write request (i.e., a write request subsequent to the write request received in operation 402). In some embodiments, when the contents or a portion of the contents of a page are changed, the existing version number (e.g., from the version data structure) is read, updated (e.g., incremented), stored in the header of the new physical page, and stored back in the version data structure. For example, in some embodiments, in accordance with a determination that LBA m is modified, the storage device obtains an updated version number for LBA m (e.g., version number 2), maps LBA m to a new physical page of the storage device, stores the updated version number (e.g., version number 2) for LBA m in a header of the new physical page, and stores the updated version number (e.g., version number 2) in the version data structure for LBA m. In some embodiments, a logical block module (e.g., logical block module 226, FIG. 2A) or one or more sub-modules of the logical block module (e.g., metadata module 228, page module 230 and/or version module 232, FIG. 2A) perform operation 430 or one or more portions of operation 430.

In some embodiments, obtaining an updated version number for the logical block comprises (432): (1) reading the version number for the logical block from the version data structure, and (2) incrementing the version number for the logical block. For example, if LBA m had version number 1 prior to LBA m being modified (e.g., by a subsequent write request), obtaining an updated version number for LBA m includes reading the version number (e.g., version number 1) for LBA m from the version data structure and incrementing the version number (e.g., from version number 1 to version number 2). In some embodiments, the version number is updated by incrementing the version number, as in the previous example where the version number is incremented by 1. In some embodiments, the version number is updated by incrementing the version number by a value other than 1 (e.g., incrementing by 5). In some embodiments, the version number is updated by modifying the version number to yield a predictable unique number. For example, in some embodiments, the version number is updated by multiplying the version number by 2 (e.g., so a version number is updated from 1 to 2 to 4 to 8, etc.).

In some embodiments, the storage device receives (434) a read request from the host (e.g., computer system 110, FIG. 1), wherein the read request specifies a second set of one or more logical block addresses in the logical address space of the host from which to read. In some embodiments, an I/O receiving module (e.g., I/O receiving module 210, FIG. 2A) is used to receive, at the storage device, a read request from the host, wherein the read request specifies a second set of one or more logical block addresses in the logical address space of the host from which to read, as described above with respect to FIG. 2A.

In some embodiments, the storage device maps (436), using the mapping table (e.g., forward mapping table 302, FIG. 3), the second set of one or more logical block addresses associated with the read request to a second set of one or more physical addresses corresponding to one or more physical pages of the storage device. In some embodiments, a mapping module (e.g., mapping module 212, FIG. 2A) is used to map, using the mapping table, the second set of one or more logical block addresses associated with the read request to a second set of one or more physical addresses corresponding to one or more physical pages of the storage device, as described above with respect to FIG. 2A.

In some embodiments, the storage device performs (438) one or more operations for each logical block specified by the second set of one or more logical block addresses, including: (1) reading (440) the version number for the logical block from the version data structure, (2) reading (442) the version number for the logical block from the header of the physical page in which the logical block is stored, (3) comparing (444) the version number from the version data structure with the version number from the header of the physical page, and (4) in accordance with a determination that the version number from the version data structure is not equivalent to the version number from the header of the physical page, initiating (446) one or more recovery actions. For example, if LBA n (FIG. 3) is included in the read request of operation 434, the storage device reads the version number for LBA n from the version data structure (e.g., version data structure 244 associated with LBA n, FIG. 2B), reads the version number for LBA n from the header of the physical page in which LBA n is stored (e.g., Bank 8, Block 210, Page 10), compares the version number from the version data structure with the version number from the header of the physical page, and in accordance with a determination that the version number from the version data structure is not equivalent to the version number from the header of the physical page, initiates one or more recovery actions. In some embodiments, the one or more recovery actions include returning an error to the host. In some embodiments, the one or more recovery actions include performing a predetermined amount of re-reading of the data before returning an error to the host. In some embodiments, a logical block module (e.g., logical block module 226, FIG. 2A), including a page module (e.g., page module 230, FIG. 2A), a version module (e.g., version module 232, FIG. 2A), a comparison module (e.g., comparison module 234, FIG. 2A) and/or a recovery module (e.g., recovery module 236, FIG. 2A) are used to perform one or more of the aforementioned operations 440, 442, 444, 446, for each logical block specified by the second set of one or more logical block addresses (specified by the read request received at 434).

In some embodiments, some (e.g., one, some, or all) of the operations performed for each logical block specified by the second set of one or more logical block addresses are performed at the storage device (e.g., storage device 120, FIG. 1). In some embodiments, some (e.g., one, some, or all) of the operations performed for each logical block specified by the second set of one or more logical block addresses are performed at the host (e.g., computer system 110, FIG. 1). In some embodiments, one or more of the operations are performed at the storage device (e.g., storage device 120, FIG. 1) and one or more of the operations are performed at the host (e.g., computer system 110, FIG. 1). For ease of explanation, the description herein describes embodiments wherein the one or more operations are performed at the storage device. However, in some embodiments, one or more of the operations are performed at the host and data, signals and/or commands are transmitted to the storage device as needed.

In some embodiments, the storage device, in accordance with a determination that, for all the logical blocks specified by the second set of one or more logical block addresses, the version number from the version data structure is equivalent to the version number from the header of the physical page, returns (448) data read from the second set of one or more logical block addresses to the host. For example, if the second set of one or more logical block addresses includes LBA n, LBA n+1, and LBA n+2, in accordance with a determination that for all the logical blocks (e.g., LBA n, LBA n+1, and LBA n+2), the version number from the respective version data structure is equivalent to the version number from the header of the respective physical page, the storage device returns data read from LBA n, LBA n+1, and LBA n+2 to the host. In some embodiments, a logical block module (e.g., logical block module 226, FIG. 2A), one or more sub-modules of the logical block module and/or a data read module (e.g., data read module 214, FIG. 2A) are used to perform operation 448, and thereby return the data requested by the received read request.

Figure 5A:
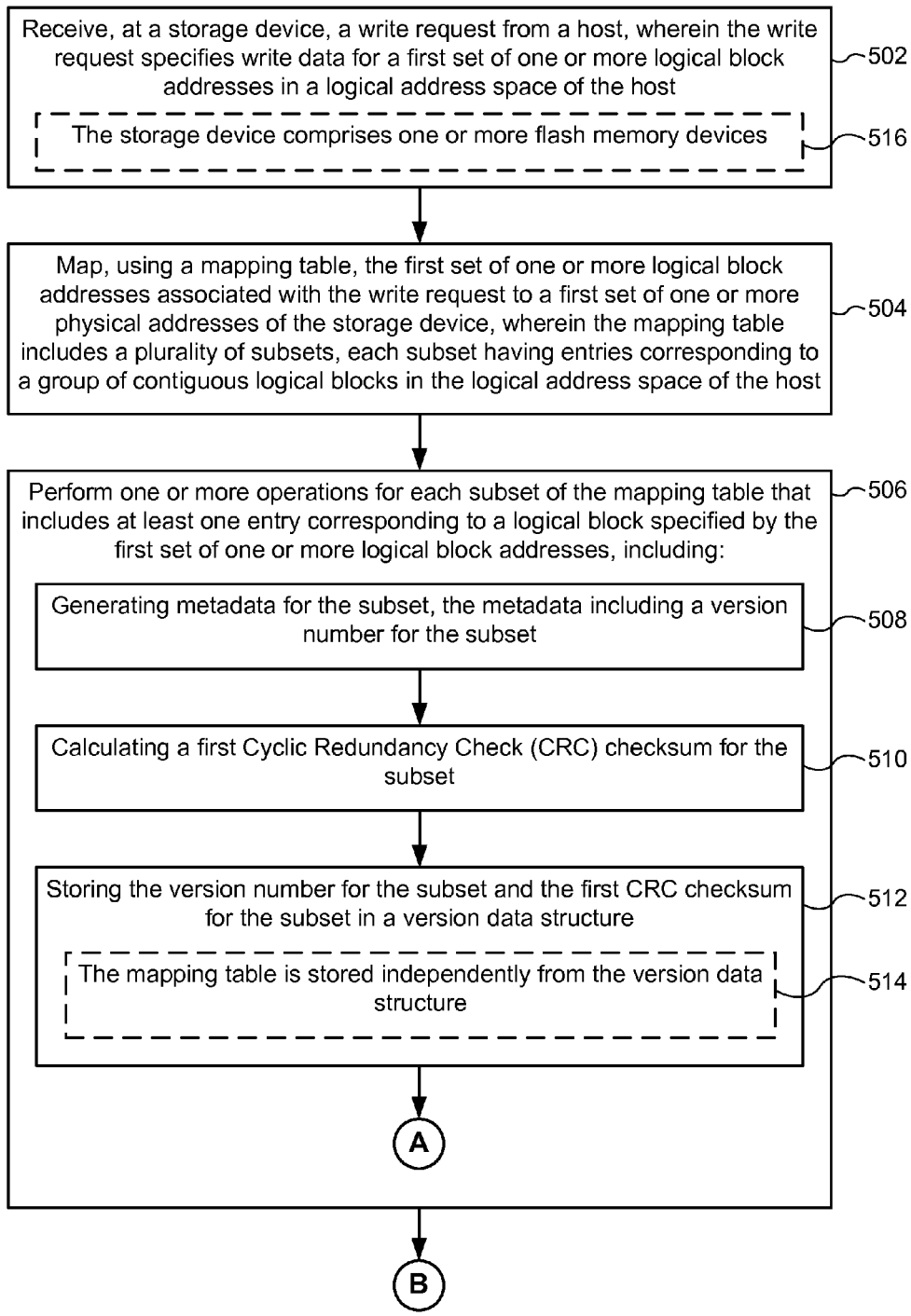
FIGS. 5A-5C illustrate a flowchart representation of a method of enhancing data integrity, in accordance with some embodiments.
Figure 5B:
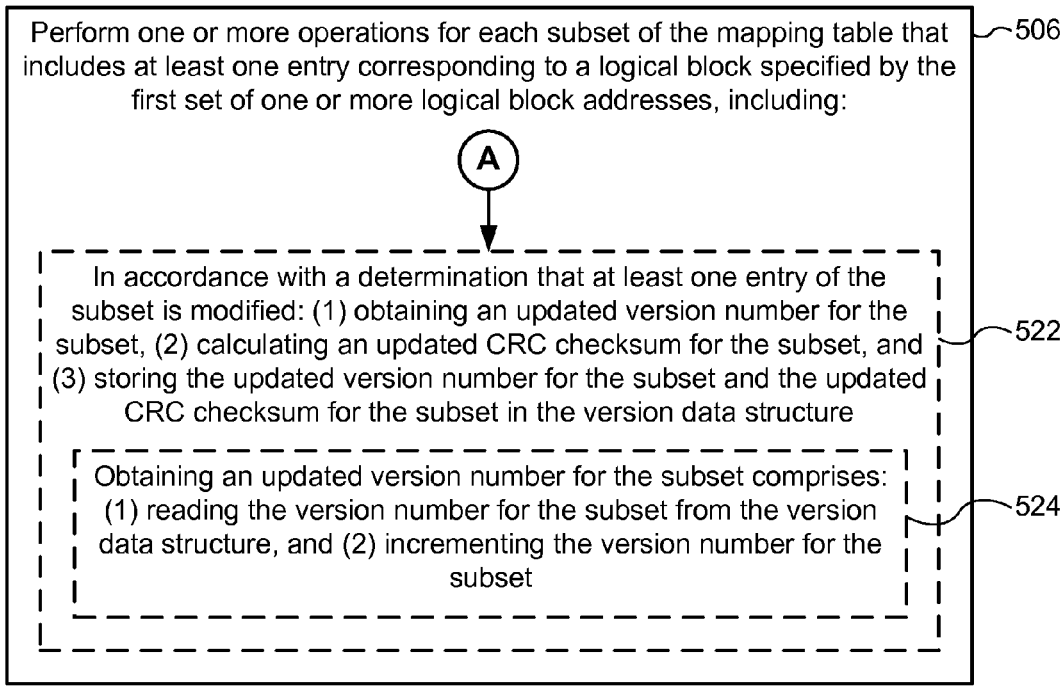
Figure 5C:
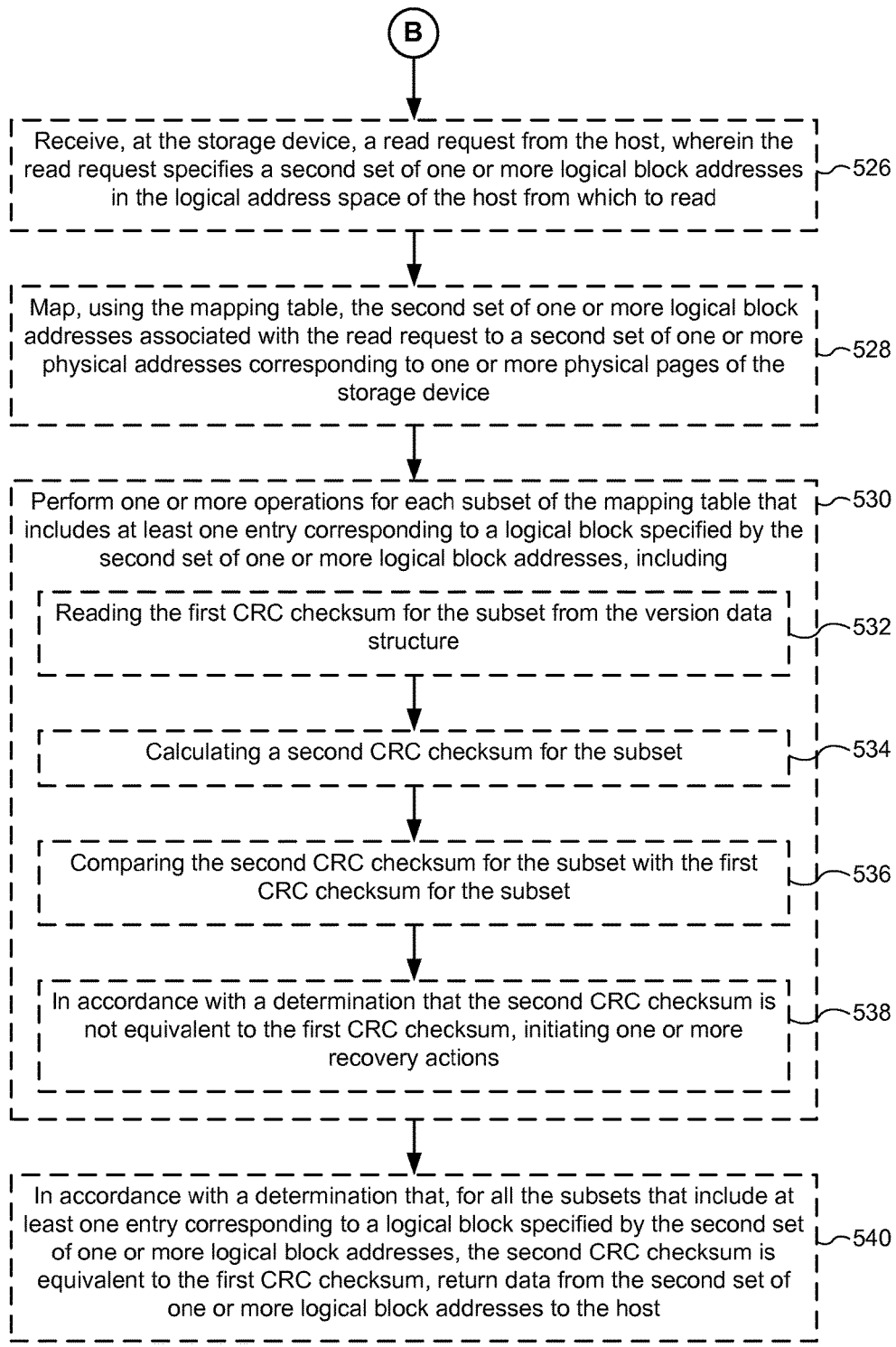

FIGS. 5A-5C illustrate a flowchart representation of a method 500 of enhancing data integrity, in accordance with some embodiments. At least in some embodiments, method 500 is performed by a storage device (e.g., storage device 120, FIG. 1) or one or more components of the storage device (e.g., storage controller 124 and/or storage medium 130, FIG. 1), wherein the storage device is operatively coupled with a host system (e.g., computer system 110, FIG. 1). In some embodiments, method 500 is governed by instructions that are stored in a non-transitory computer readable storage medium and that are executed by one or more processors of a device, such as the one or more processing units (CPUs) 122-1 of management module 121-1-A, shown in FIGS. 1 and 2C. In some embodiments, method 500 is performed by a storage system (e.g., data storage system 100, FIG. 1) or one or more components of the storage system (e.g., computer system 110 and/or storage device 120, FIG. 1). In some embodiments, some of the operations of method 500 are performed at a host (e.g., computer system 110, FIG. 1) and information is transmitted to a storage device (e.g., storage device 120, FIG. 1). In some embodiments, method 500 is governed, at least in part, by instructions that are stored in a non-transitory computer readable storage medium and that are executed by one or more processors of a host (not shown in FIG. 1). For ease of explanation, the following describes method 500 as performed by a storage device (e.g., storage device 120, FIG. 1). However, those skilled in the art will appreciate that in other embodiments, one or more of the operations described in method 500 are performed by a host (e.g., computer system 110, FIG. 1).

A storage device (e.g., storage device 120, FIG. 1), receives (502) a write request from a host (e.g., computer system 110, FIG. 1), wherein the write request specifies write data, for a first set of one or more logical block addresses in a logical address space of the host, to be written to non-volatile memory (e.g., storage medium 130, FIG. 1) in the storage device. In some embodiments, an I/O receiving module (e.g., I/O receiving module 210, FIG. 2C) is used to receive, at a storage device, a write request from a host, wherein the write request specifies write data for a first set of one or more logical block addresses in a logical address space of the host, as described above with respect to FIG. 2C.

In some embodiments, the storage device includes (516) one or more flash memory devices. In some embodiments, the storage device includes a storage medium (e.g., storage medium 130, FIG. 1), and the storage medium includes one or more non-volatile storage devices, such as flash memory devices. In some embodiments, the storage medium (e.g., storage medium 130, FIG. 1) is a single flash memory device, while in other embodiments the storage medium includes a plurality of flash memory devices. For example, in some embodiments, the storage medium includes dozens or hundreds of flash memory devices, organized in parallel memory channels, such as 16, 32 or 64 flash memory devices per memory channel, and 8, 16 or 32 parallel memory channels. In some embodiments, the non-volatile storage medium (e.g., storage medium 130, FIG. 1) includes NAND-type flash memory or NOR-type flash memory. In other embodiments, the storage medium comprises one or more other types of non-volatile storage devices.

The storage device maps (504), using a mapping table (e.g., forward mapping table 302, FIG. 3), the first set of one or more logical block addresses associated with the write request to a first set of one or more physical addresses of the storage device, wherein the mapping table includes a plurality of subsets, each subset having entries corresponding to a group of contiguous logical blocks in the logical address space of the host. For example, in FIG. 3, forward mapping table includes a plurality of subsets (e.g., subsets 1 to N) and each subset (e.g., subset i) has entries corresponding to a group of contiguous logical blocks (e.g., LBA m to LBA n) in the logical address space (e.g., logical address space 310) of the host (e.g., computer system 110, FIG. 1). In some embodiments, a mapping module (e.g., mapping module 212, FIG. 2C) is used to map, using a mapping table, the first set of one or more logical block addresses associated with the write request to a first set of one or more physical addresses of the storage device; and furthermore, the mapping table includes a plurality of subsets, each subset having entries corresponding to a group of contiguous logical blocks in the logical address space of the host, as described above with respect to FIG. 2C.

The storage device performs (506) one or more operations for each subset of the mapping table that includes at least one entry corresponding to a logical block specified by the first set of one or more logical block addresses, including: (1) generating (508) metadata for the subset, the metadata including a version number for the subset, (2) calculating (510) a first Cyclic Redundancy Check (CRC) checksum for the subset, and (3) storing (512) the version number for the subset and the first CRC checksum for the subset in a version data structure. In some embodiments, a subset module (e.g., subset module 256, FIG. 2C), including a metadata module (e.g., metadata module 258, FIG. 2C), a CRC module (e.g., CRC module 260, FIG. 2C), and/or a version module (e.g., version module 262, FIG. 2C) are used to perform operations 508, 510 and 512, or one or more of those operations, for each subset of the mapping table that includes at least one entry corresponding to a logical block specified by the first set of one or more logical block addresses.

In some embodiments, some (e.g., one, some, or all) of the operations performed for each subset of the mapping table that includes at least one entry corresponding to a logical block specified by the first set of one or more logical block addresses are performed at the storage device (e.g., storage device 120, FIG. 1). In some embodiments, some (e.g., one, some, or all) of the operations performed for each subset of the mapping table that includes at least one entry corresponding to a logical block specified by the first set of one or more logical block addresses are performed at the host (e.g., computer system 110, FIG. 1). In some embodiments, one or more of the operations are performed at the storage device (e.g., storage device 120, FIG. 1) and one or more of the operations are performed at the host (e.g., computer system 110, FIG. 1). For ease of explanation, the description herein describes embodiments wherein the one or more operations are performed at the storage device. However, in some embodiments, one or more of the operations are performed at the host and data, signals and/or commands are transmitted to the storage device as needed.

As noted above, the storage device generates (508) metadata for the subset, the metadata including a version number for the subset. In some embodiments, since the subset has entries corresponding to a group of contiguous logical blocks in the logical address space of the host, the version number for the subset is maintained across a set of contiguous mapping entries, as shown in FIG. 3. In some embodiments, if the subset is being written for the first time, the storage device generates metadata for the subset, the metadata including an initial version number (e.g., version number 1) for the subset. For example, if subset i of forward mapping table 302 (FIG. 3) was previously unused and now a write request from a host (e.g., computer system 110, FIG. 1) specifies write data for LBA m (in subset i), the storage device generates metadata for subset i, the metadata including a version number (e.g., version number 1) for subset i. The purpose of the version number is to verify, when responding to a read request, that data sent to the host (e.g., computer system 110, FIG. 1) is the current version of the data and not an invalid (e.g., stale or older) version of the data. In some embodiments, a metadata module (e.g., metadata module 258, FIG. 2C) is used to generate metadata for the subset, the metadata including a version number for the subset, as described above with respect to FIG. 2C.

The storage device calculates (510) a first Cyclic Redundancy Check (CRC) checksum for the subset. In some embodiments, the first CRC checksum for the subset is calculated on data that includes the mapping table entries of the subset. Using the example of subset i from FIG. 3, in some embodiments, the storage device calculates the first CRC checksum for subset i by calculating the CRC checksum on the mapping table entries for LBA m through LBA n. In some embodiments, the first CRC checksum for the subset is calculated on data that includes both the mapping table entries of the subset and the version number for the subset. Again using the example of subset i, in some embodiments, the storage device calculates the first CRC checksum for subset i by calculating the CRC checksum on the mapping table entries for LBA m through LBA n and the version number for subset i.

The storage device stores (512) the version number for the subset and the first CRC checksum for the subset in a version data structure. Using the example of subset i from above, the storage devices stores the version number (e.g., version number 1) for subset i in a version data structure (e.g., in version number 276 of version data structure 274-i, FIG. 2D) and stores the first CRC checksum (e.g., calculated in operation 510) for subset i in the version data structure (e.g., in CRC checksum 278 of version data structure 274-i, FIG. 2D). In some embodiments, the version number stored in the version data structure is the expected version of the subset. By performing a CRC check over the expected version number and the set of mapping table entries in the subset, it is possible to detect whether the physical addresses of the pages in the mapping table are the current version. In some embodiments, the version data structure is stored in non-volatile memory. In some embodiments, the space provided for the version number is large enough to store what is reasonably expected to be the largest version value of any subset, so that the version number remains unique over time.

Alternatively, in some embodiments, the space provided for the version number is considerably smaller (e.g., a few bits) than what would be needed to store the largest reasonably expected version number. As a result, values of the version number will not be unique for the full life of the device, but will roll-over, perhaps several times. However, in these embodiments, the number of bits provided for the version number is large enough such that there is no chance that a stale value could be mistaken for a current value.

Although the examples herein describe a separate version data structure for each subset, those skilled in the art will appreciate that the embodiments described herein may be extended to other ways to store the version number and/or CRC checksum for the subset. For example, in a simple form, the stored information may be kept as a table with as many entries as there are subsets in the mapping table, where each entry has the current (e.g., expected) version number for the subset and the CRC checksum for the subset. In some embodiments, a version module (e.g., version module 262, FIG. 2C) is used to store the version number for the subset and the first CRC checksum for the subset in a version data structure, as described above with respect to FIG. 2C.

In some embodiments, the mapping table is (514) stored independently from the version data structure. As a result, both are unlikely to suffer the same logical error mechanisms or loss mechanisms. For example, when the mapping table is stored independently from the version data structure, a mistake in handling the mapping table is unlikely to also be made in the version data structure.

In some embodiments, in accordance with a determination that at least one entry of the subset is modified (522): the storage device (1) obtains an updated version number for the subset, (2) calculates an updated CRC checksum for the subset, and (3) stores the updated version number for the subset and the updated CRC checksum for the subset in the version data structure. In some embodiments, the subset is modified by a subsequent write request (after the write request received by operation 502) that modifies at least one mapping table entry of the subset. In some embodiments, when the one or more mapping table entries of the subset are changed, the existing version number (e.g., from the version data structure) is read, updated (e.g., incremented), an updated CRC checksum for the subset is calculated, and the updated version number and updated CRC checksum are stored back in the version data structure. For example, in some embodiments, in accordance with a determination that LBA m is modified, the storage device obtains an updated version number for subset i (e.g., version number 2), calculates an updated CRC checksum for subset i, and stores the updated version number (e.g., version number 2) and the updated CRC checksum for subset i in the version data structure (e.g., version data structure 274-i, FIG. 2D). In some embodiments, a subset module (e.g., subset module 256, FIG. 2C) or one or more sub-modules of the subset module (e.g., metadata module 258, CRC module 260 and/or version module 262, FIG. 2C) are used to perform operation 522, or a portion of operation 522.

In some embodiments, obtaining an updated version number for the subset comprises (524): (1) reading the version number for the subset from the version data structure, and (2) incrementing the version number for the subset. For example, if subset i had version number 1 prior to subset i being modified (e.g., by a subsequent write request to any of the logical block mapping entries of subset i), obtaining an updated version number for subset i includes reading the version number (e.g., version number 1) for subset i from the version data structure and incrementing the version number (e.g., from version number 1 to version number 2). In some embodiments, the version number is updated by incrementing the version number, as in the previous example where the version number is incremented by 1. In some embodiments, the version number is updated by incrementing the version number by a value other than 1 (e.g., incrementing by 5). In some embodiments, the version number is updated by modifying the version number to yield a predictable unique number. For example, in some embodiments, the version number is updated by multiplying the version number by 2 (e.g., so a version number is updated from 1 to 2 to 4 to 8, etc.).

In some embodiments, the storage device receives (526) a read request from the host (e.g., computer system 110, FIG. 1), wherein the read request specifies a second set of one or more logical block addresses in the logical address space of the host from which to read. In some embodiments, an I/O receiving module (e.g., I/O receiving module 210, FIG. 2C) is used to receive, at the storage device, a read request from the host, wherein the read request specifies a second set of one or more logical block addresses in the logical address space of the host from which to read, as described above with respect to FIG. 2C.

In some embodiments, the storage device maps (528), using the mapping table (e.g., forward mapping table 302, FIG. 3), the second set of one or more logical block addresses associated with the read request to a second set of one or more physical addresses corresponding to one or more physical pages of the storage device. In some embodiments, a mapping module (e.g., mapping module 212, FIG. 2C) is used to map, using the mapping table, the second set of one or more logical block addresses associated with the read request to a second set of one or more physical addresses corresponding to one or more physical pages of the storage device, as described above with respect to FIG. 2C.

In some embodiments, the storage device performs (530) one or more operations for each subset of the mapping table that includes at least one entry corresponding to a logical block specified by the second set of one or more logical block addresses, including: (1) reading (532) the first CRC checksum for the subset from the version data structure, (2) calculating (534) a second CRC checksum for the subset, (3) comparing (536) the second CRC checksum for the subset with the first CRC checksum for the subset, and (4) in accordance with a determination that the second CRC checksum is not equivalent to the first CRC checksum, initiating (538) one or more recovery actions. For example, if LBA n (FIG. 3) is included in the read request of operation 526, the storage device reads the first CRC checksum for subset i (since LBA n is in subset i) from the version data structure (e.g., from CRC checksum 278 of version data structure 274-i, FIG. 2D), calculates a second CRC checksum for subset i (e.g., on the version number 276 of version data structure 274-i and the set of mapping table entries of subset i), compares the second CRC checksum for subset i with the first CRC checksum for subset i, and in accordance with a determination that the second CRC checksum is not equivalent to the first CRC checksum, initiates one or more recovery actions. In some embodiments, the one or more recovery actions include returning an error to the host. In some embodiments, the one or more recovery actions include performing a predetermined amount of re-reading of the data before returning an error to the host. In some embodiments, a subset module (e.g., subset module 256, FIG. 2C), or one or more sub-modules of the subset module (e.g., CRC module 260, version module 262, comparison module 264 and/or recover module 266, FIG. 2C) are used to perform one or more of the aforementioned operations 532, 534, 536, 538, for each subset of the mapping table that includes at least one entry corresponding to a logical block specified by the second set of one or more logical block addresses (specified by the read request received at 526).

In some embodiments, some (e.g., one, some, or all) of the operations performed for each subset of the mapping table that includes at least one entry corresponding to a logical block specified by the second set of one or more logical block addresses are performed at the storage device (e.g., storage device 120, FIG. 1). In some embodiments, some (e.g., one, some, or all) of the operations performed for each subset of the mapping table that includes at least one entry corresponding to a logical block specified by the second set of one or more logical block addresses are performed at the host (e.g., computer system 110, FIG. 1). In some embodiments, one or more of the operations are performed at the storage device (e.g., storage device 120, FIG. 1) and one or more of the operations are performed at the host (e.g., computer system 110, FIG. 1). For ease of explanation, the description herein describes embodiments wherein the one or more operations are performed at the storage device. However, in some embodiments, one or more of the operations are performed at the host and data, signals and/or commands are transmitted to the storage device as needed.

In some embodiments, the storage device, in accordance with a determination that, for all the subsets that include at least one entry corresponding to a logical block specified by the second set of one or more logical block addresses, the second CRC checksum is equivalent to the first CRC checksum, returns (540) data from the second set of one or more logical block addresses to the host. For example, if the second set of one or more logical block addresses includes LBA n, LBA n+1, and LBA n+2 (FIG. 3), in accordance with a determination that for all the subsets that include at least one entry corresponding to a logical block specified by the second set of one or more logical block addresses (e.g., subset i and subset i+1), the second CRC checksum is equivalent to the first CRC checksum, the storage device returns data from LBA n, LBA n+1, and LBA n+2 to the host. In some embodiments, a subset module (e.g., subset module 256, FIG. 2C), one or more sub-modules of the subset module and/or a data read module (e.g., data read module 214, FIG. 2C) are used to perform operation 540, and thereby return the data requested by the received read request.

It will be understood that, although the terms "first," "second," etc. may be used herein to describe various elements, these elements should not be limited by these terms. These terms are only used to distinguish one element from another. For example, a first region could be termed a second region, and, similarly, a second region could be termed a first region, without changing the meaning of the description, so long as all occurrences of the "first region" are renamed consistently and all occurrences of the "second region" are renamed consistently. The first region and the second region are both regions, but they are not the same region.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phase reads on a single instance of A alone, a single instance of B alone, or a single instance of C alone, while also encompassing combinations of the listed items such "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of enhancing data integrity, the method comprising:
   receiving, at a storage device, a write request from a host, wherein the write request specifies write data for a first set of one or more logical block addresses in a logical address space of the host;
   mapping the first set of one or more logical block addresses associated with the write request to a first set of one or more physical addresses of the storage device, the first set of one or more physical addresses corresponding to one or more physical pages of the storage device, wherein the mapping of the first set of one or more logical block addresses associated with the write request to the first set of one or more physical addresses of the storage device is stored in a mapping table; and
   performing, at the storage device, one or more operations for each logical block specified by the first set of one or more logical block addresses, including:
      generating metadata for the logical block, the metadata including a version number for the logical block;
      storing the metadata, including the version number, for the logical block in a header of a physical page in which the specified write data for the logical block is stored; and
      storing the version number for the logical block in a version data structure,
   wherein:
      the version data structure is a separate data structure from the mapping table,
      after said performing, the version data structure includes entries with version numbers for multiple logical block addresses, including the first set of one or more logical block addresses, and
      the mapping data structure includes logical address to physical address mapping entries for multiple logical block addresses, including the first set of one or more logical block addresses.

2. The method of claim 1, wherein performing one or more operations for each logical block specified by the first set of one or more logical block addresses further includes:
   in accordance with a determination that the logical block is modified:
      obtaining an updated version number for the logical block;
      mapping the logical block to a new physical page of the storage device, wherein the mapping of the logical block to the new physical page of the storage device is stored in the mapping table;
      storing the updated version number for the logical block in a header of the new physical page in which the logical block is stored; and
      storing the updated version number for the logical block in the version data structure.

3. The method of claim 2, wherein obtaining an updated version number for the logical block comprises:
   reading the version number for the logical block from the version data structure; and
   incrementing the version number for the logical block.

4. The method of claim 1, further comprising:
   receiving, at the storage device, a read request from the host, wherein the read request specifies a second set of one or more logical block addresses in the logical address space of the host from which to read;
   mapping the second set of one or more logical block addresses associated with the read request to a second set of one or more physical addresses corresponding to one or more physical pages of the storage device, wherein a mapping of the second set of one or more logical block addresses associated with the read request to the second set of one or more physical addresses corresponding to the one or more physical pages of the storage device is stored in the mapping table; and
   performing, at the storage device, one or more operations for each logical block specified by the second set of one or more logical block addresses, including:
      reading the version number for the logical block from the version data structure;
      reading the version number for the logical block from the header of the physical page in which the logical block is stored;
      comparing the version number from the version data structure with the version number from the header of the physical page; and
      in accordance with a determination that the version number from the version data structure is not equivalent to the version number from the header of the physical page, initiating one or more recovery actions; and
   in accordance with a determination that, for all the logical blocks specified by the second set of one or more logical block addresses, the version number from the version data structure is equivalent to the version number from the header of the physical page, returning data read from the second set of one or more logical block addresses to the host.

5. The method of claim 1, wherein performing the one or more operations for each logical block specified by the first set of one or more logical block addresses further includes writing write data for the logical block to a physical page corresponding to a physical address determined by the mapping.

6. The method of claim 1, wherein the metadata for the logical block includes a checksum from a Cyclic Redundancy Check (CRC) operation.

7. The method of claim 1, wherein the metadata for the logical block includes an identification value.

8. The method of claim 1, wherein the metadata for the logical block includes an application tag.

9. The method of claim 1, wherein the metadata for the logical block includes a reference tag.

10. The method of claim 1, wherein the storage device comprises one or more flash memory devices.

11. A storage device, comprising:
    a storage medium;
    memory distinct from the storage medium, the memory storing a mapping table, the mapping table including information for mapping logical addresses in a logic address space of a host to physical addresses in a physical address space of the storage system; and
    a storage controller having one or more processors configured to execute instructions in one or more programs, wherein the storage controller is configured to perform operations comprising:
       receiving, at the storage device, a write request from the host, wherein the write request specifies write data for a first set of one or more logical block addresses in the logical address space of the host;
       mapping the first set of one or more logical block addresses associated with the write request to a first set of one or more physical addresses of the storage device, the first set of one or more physical addresses corresponding to one or more physical pages of the storage device, wherein the mapping of the first set of one or more logical block addresses associated with the write request to the first set of one or more physical addresses of the storage device is stored in the mapping table; and performing, at the storage device, one or more operations for each logical block specified by the first set of one or more logical block addresses, including:
generating metadata for the logical block, the metadata including a version number for the logical block;
storing the metadata, including the version number, for the logical block in a header of a physical page in which the specified write data for the logical block is stored; and
storing the version number for the logical block in a version data structure, wherein:
the version data structure is a separate data structure from the mapping table,
after said performing, the version data structure includes entries with version numbers for multiple logical block addresses, including the first set of one or more logical block addresses, and
the mapping data structure includes logical address to physical address mapping entries for multiple logical block addresses, including the first set of one or more logical block addresses.

12. The storage device of claim 11, wherein the storage controller includes:
a version module for generating the version number for the logical block and storing the version number for the logical block in the version data structure; and
a recovery module for initiating one or more recovery actions in accordance with a determination that a version number obtained from the version data structure is not equivalent to a version number obtained from a header of a respective physical page in the storage medium.

13. The storage device of claim 11, wherein performing one or more operations for each logical block specified by the first set of one or more logical block addresses further includes:
in accordance with a determination that the logical block is modified:
obtaining an updated version number for the logical block;
mapping the logical block to a new physical page of the storage device, wherein the mapping of the logical block to the new physical page of the storage device is stored in the mapping table;
storing the updated version number for the logical block in a header of the new physical page in which the logical block is stored; and
storing the updated version number for the logical block in the version data structure.

14. The storage device of claim 13, wherein obtaining an updated version number for the logical block comprises:
reading the version number for the logical block from the version data structure; and
incrementing the version number for the logical block.

15. The storage device of claim 11, wherein the storage controller is further configured to perform operations comprising:

receiving, at the storage device, a read request from the host, wherein the read request specifies a second set of one or more logical block addresses in the logical address space of the host from which to read;
mapping the second set of one or more logical block addresses associated with the read request to a second set of one or more physical addresses corresponding to one or more physical pages of the storage device, wherein a mapping of the second set of one or more logical block addresses associated with the read request to the second set of one or more physical addresses corresponding to the one or more physical pages of the storage device is stored in the mapping table; and
performing, at the storage device, one or more operations for each logical block specified by the second set of one or more logical block addresses, including:
reading the version number for the logical block from the version data structure;
reading the version number for the logical block from the header of the physical page in which the logical block is stored;
comparing the version number from the version data structure with the version number from the header of the physical page; and
in accordance with a determination that the version number from the version data structure is not equivalent to the version number from the header of the physical page, initiating one or more recovery actions; and
in accordance with a determination that, for all the logical blocks specified by the second set of one or more logical block addresses, the version number from the version data structure is equivalent to the version number from the header of the physical page, returning data read from the second set of one or more logical block addresses to the host.

16. The storage device of claim 11, wherein performing the one or more operations for each logical block specified by the first set of one or more logical block addresses includes writing write data for the logical block to a physical page corresponding to a physical address determined by the mapping.

17. The storage device of claim 11, wherein the metadata for the logical block includes a checksum from a Cyclic Redundancy Check (CRC) operation.

18. The storage device of claim 11, wherein the metadata for the logical block includes an identification value.

19. A non-transitory computer-readable storage medium, storing one or more programs configured for execution by one or more processors of a storage device, the one or more programs including instructions for:
receiving, at a storage device, a write request from a host, wherein the write request specifies write data for a first set of one or more logical block addresses in a logical address space of the host;
mapping the first set of one or more logical block addresses associated with the write request to a first set of one or more physical addresses of the storage device, the first set of one or more physical addresses corresponding to one or more physical pages of the storage device, wherein the mapping of the first set of one or more logical block addresses associated with the write request to the first set of one or more physical addresses of the storage device is stored in a mapping table; and
performing, at the storage device, one or more operations for each logical block specified by the first set of one or more logical block addresses, including:

generating metadata for the logical block, the metadata including a version number for the logical block;

storing the metadata, including the version number, for the logical block in a header of a physical page in which the specified write data for the logical block is stored; and storing the version number for the logical block in a version data structure, wherein:

the version data structure is a separate data structure from the mapping table, after said performing, the version data structure includes entries with version numbers for multiple logical block addresses, including the first set of one or more logical block addresses, and the mapping data structure includes logical address to physical address mapping entries for multiple logical block addresses, including the first set of one or more logical block addresses.

20. The storage medium of claim 19, wherein performing one or more operations for each logical block specified by the first set of one or more logical block addresses further includes:

in accordance with a determination that the logical block is modified:

obtaining an updated version number for the logical block;

mapping the logical block to a new physical page of the storage device, wherein the mapping of the logical block to the new physical page of the storage device is stored in the mapping table;

storing the updated version number for the logical block in a header of the new physical page in which the logical block is stored; and storing the updated version number for the logical block in the version data structure.

21. The storage medium of claim 20, wherein obtaining an updated version number for the logical block comprises:

reading the version number for the logical block from the version data structure; and incrementing the version number for the logical block.

22. The storage medium of claim 19, wherein the one or more programs further include instructions for:

receiving, at the storage device, a read request from the host, wherein the read request specifies a second set of one or more logical block addresses in the logical address space of the host from which to read;

mapping the second set of one or more logical block addresses associated with the read request to a second set of one or more physical addresses corresponding to one or more physical pages of the storage device, wherein a mapping of the second set of one or more logical block addresses associated with the read request to the second set of one or more physical addresses corresponding to one or more physical pages of the storage device is stored in the mapping table;

performing, at the storage device, one or more operations for each logical block specified by the second set of one or more logical block addresses, including:

reading the version number for the logical block from the version data structure;

reading the version number for the logical block from the header of the physical page in which the logical block is stored;

comparing the version number from the version data structure with the version number from the header of the physical page; and in accordance with a determination that the version number from the version data structure is not equivalent to the version number from the header of the physical page, initiating one or more recovery actions; and in accordance with a determination that, for all the logical blocks specified by the second set of one or more logical block addresses, the version number from the version data structure is equivalent to the version number from the header of the physical page, returning data read from the second set of one or more logical block addresses to the host.

23. The storage medium of claim 19, wherein performing the one or more operations for each logical block specified by the first set of one or more logical block addresses further includes writing write data for the logical block to a physical page corresponding to a physical address determined by the mapping.

24. The storage medium of claim 19, wherein the metadata for the logical block includes a checksum from a Cyclic Redundancy Check (CRC) operation.

25. The storage medium of claim 19, wherein the metadata for the logical block includes an identification value.

* * * * *